United States Patent
Hwang et al.

(10) Patent No.: US 12,346,569 B2
(45) Date of Patent: Jul. 1, 2025

(54) STORAGE DEVICE, ELECTRONIC DEVICE INCLUDING STORAGE DEVICE, AND OPERATING METHOD OF ELECTRONIC DEVICE INCLUDING STORAGE DEVICE

(71) Applicant: SAMSUNG ELECTRONICS CO., LTD., Suwon-si (KR)

(72) Inventors: Jooyoung Hwang, Suwon-si (KR); Hyun Jin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/388,329

(22) Filed: Nov. 9, 2023

(65) Prior Publication Data

US 2024/0311015 A1 Sep. 19, 2024

(30) Foreign Application Priority Data

Mar. 14, 2023 (KR) ........................ 10-2023-0033457

(51) Int. Cl.
*G06F 3/06* (2006.01)
*G06F 12/02* (2006.01)

(52) U.S. Cl.
CPC .......... *G06F 3/0616* (2013.01); *G06F 3/0656* (2013.01); *G06F 3/0659* (2013.01); *G06F 3/0679* (2013.01); *G06F 12/0246* (2013.01); *G06F 2212/7205* (2013.01)

(58) Field of Classification Search
CPC ......... G06F 12/0246; G06F 2212/7205; G06F 3/061; G06F 3/0616; G06F 3/0656; G06F 3/0659; G06F 3/0679

See application file for complete search history.

(56) References Cited

U.S. PATENT DOCUMENTS

| | | |
|---|---|---|
| 9,128,820 B1 | 9/2015 | Malina |
| 10,055,143 B2 | 8/2018 | Hung et al. |
| 10,120,573 B2 | 11/2018 | Alexander |
| 11,455,244 B2 | 9/2022 | Tikoo et al. |
| 2017/0017405 A1 | 1/2017 | Dubeyko et al. |
| 2022/0138099 A1 | 5/2022 | Kang |
| 2022/0244869 A1* | 8/2022 | Kanteti ................ G06F 3/0631 |
| 2022/0318133 A1 | 10/2022 | Hsu et al. |

FOREIGN PATENT DOCUMENTS

CN 112306896 A 2/2021

* cited by examiner

*Primary Examiner* — Yong J Choe
(74) *Attorney, Agent, or Firm* — Sughrue Mion, PLLC

(57) ABSTRACT

In some embodiments, a storage device includes a nonvolatile memory device including a plurality of erase units, and a memory controller. Each of the plurality of erase units include a plurality of memory cells. The memory controller is configured to assign first memory cells of each of first erase units among the plurality of erase units as y-level cells, assign second memory cells of each of second erase units among the plurality of erase units as x-level cells, allocate a zone to at least one first erase unit among the first erase units and permit a sequential write with respect to the zone, buffer data to be written in the zone by using at least one second erase unit among the second erase units, and provide, to the external host device, information about the at least one second erase unit buffering the data to be written in the zone.

20 Claims, 14 Drawing Sheets

STORAGE DEVICE, ELECTRONIC DEVICE INCLUDING STORAGE DEVICE, AND OPERATING METHOD OF ELECTRONIC DEVICE INCLUDING STORAGE DEVICE

CROSS-REFERENCE TO RELATED APPLICATIONS

This application claims benefit of priority under 35 U.S.C. § 119 to Korean Patent Application No. 10-2023-0033457, filed on Mar. 14, 2023, in the Korean Intellectual Property Office, the disclosure of which is incorporated by reference herein in its entirety.

BACKGROUND

The present disclosure relates generally to an electronic device, and more particularly, to a storage device reducing a write amplification factor (WAF), an electronic device including the storage device, and an operating method of the electronic device including the storage device.

A storage device may refer to a device that may store data under control of a host device, such as, but not limited to, a computer, a smartphone, a smart pad, and the like. The storage device may be and/or may include a device that may store data on a magnetic disk, such as, but not limited to, a hard disk drive (HDD). Alternatively or additionally, the storage device may be and/or may include a device that may store data in a semiconductor memory, such as, but not limited to, a non-volatile memory, such as a solid state drive (SSD) and/or a memory card.

The nonvolatile memory may be and/or may include, but not be limited to, a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), resistive RAM (RRAM), a ferroelectric RAM (FRAM), and the like.

The lifetime and reliability of a nonvolatile memory may be reduced whenever a write operation is performed in the nonvolatile memory. For example, a flash memory may have a write-before-erase characteristic in which an erase operation may need to be performed between write operations. Because a write operation of the flash memory may cause an erase operation followed by a next write operation, the repetitive write operation of the flash memory may reduce the lifetime and reliability of the flash memory.

SUMMARY

Aspects of the present disclosure provide for a storage device having a reduced write amplification factor (WAF) when compared to related storage devices, such that a lifetime and reliability of the storage device may be potentially improved. Aspects of the present disclosure provide for an electronic device including the storage device, and an operating method of the electronic device including the storage device.

According to an aspect of the present disclosure, a storage device is provided. The storage device includes a nonvolatile memory device including a plurality of erase units and a memory controller. Each erase unit of the plurality of erase units includes a plurality of memory cells. The memory controller is configured to assign first memory cells of each erase unit of a plurality of first erase units among the plurality of erase units as y-level cells, y being a positive integer greater than zero. The memory controller is further configured to assign second memory cells of each erase unit of a plurality of second erase units among the plurality of erase units as x-level cells, x being a positive integer greater than zero and less than y. The memory controller is further configured to allocate, based on an open zone request received from an external host device, a zone to at least one first erase unit among the plurality of first erase units, and permit a sequential write with respect to the zone. The memory controller is further configured to buffer data to be written in the zone by storing the data in at least one second erase unit among the plurality of second erase units. The memory controller is further configured to provide, to the external host device, information about the at least one second erase unit buffering the data to be written in the zone.

According to an aspect of the present disclosure, an electronic device is provided. The electronic device includes a storage device including a plurality of erase units, and a processor. Each erase unit of the plurality of erase units includes a plurality of memory cells. The storage device is configured to assign first memory cells of each erase unit of a plurality of first erase units among the plurality of erase units as y-level cells, and assign second memory cells of each erase unit of a plurality of second erase units among the plurality of erase units as x-level cells, y being a positive integer greater than zero, and x being a positive integer greater than zero and less than y. The processor is configured to allocate zones to the plurality of first erase units by sending, to the storage device, an open zone request to the storage device, and perform a sequential write with respect to the zones. The storage device is further configured to buffer data to be written in the zones by storing the data in the plurality of second erase units, and provide, to the processor, information about the plurality of second erase units. The processor is further configured to perform garbage collection of the plurality of second erase units based on the information about the plurality of second erase units.

According to an aspect of the present disclosure, an operating method of an electronic device is provided. The operating method includes sending, by a processor of the electronic device, zone open requests to a storage device of the electronic device. The operating method further includes allocating, by the storage device and based on the zone open requests, a plurality of first erase units among a plurality of erase units of the storage device to a plurality of zones. The operating method further includes sending, by the processor to the storage device, sequential write requests respectively associated with the plurality of zones. The operating method further includes buffering, by the storage device, write data of the sequential write requests by using a plurality of second erase units among the plurality of erase units. The operating method further includes sending, by the storage device to the processor, information about the plurality of second erase units. The operating method further includes performing, by the processor, garbage collection of the plurality of second erase units based on the information about the plurality of second erase units. The operating method further includes assigning, by the storage device, first memory cells of each erase unit of the plurality of first erase units as y-level cells, y being a positive integer greater than zero. The operating method further includes assigning, by the storage device, second memory cells of each erase unit of the plurality of second erase units as x-level cells, x being a positive integer greater than zero and less than y.

Additional aspects may be set forth in part in the description which follows and, in part, may be apparent from the description, and/or may be learned by practice of the presented embodiments.

BRIEF DESCRIPTION OF THE FIGURES

The above and other aspects, features, and advantages of certain embodiments of the present disclosure may be more apparent from the following description taken in conjunction with the accompanying drawings, in which.

DETAILED DESCRIPTION

Figure 1:
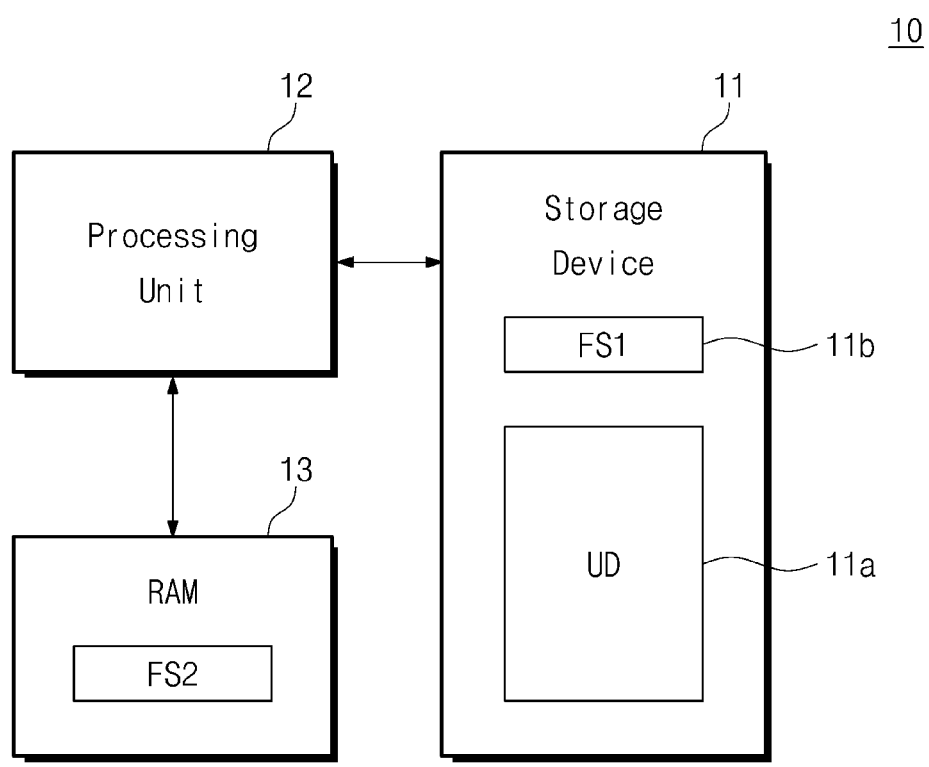
FIG. 1 illustrates an electronic device, according to an embodiment of the present disclosure.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", and the like may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", and the like may be used to distinguish components from each other and do not limit the present disclosure. For example, the terms "first", "second", "third", and the like may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, various embodiments of the present disclosure are described with reference to the accompanying drawings.

FIG. 1 illustrates an electronic device 10, according to an embodiment of the present disclosure. Referring to FIG. 1, the electronic device 10 may include a storage device 11, a processing unit 12, and a random access memory (RAM) 13.

The storage device 11 may be and/or may include a nonvolatile memory (NVM) device that may retain data even when a power applied to the storage device 11 may be turned off. The storage device 11 may be and/or may include a first storage region 11a and a second storage region 11b.

In an embodiment, the first storage region 11a may store user data UD that the processing unit 12 may request the storage device 11 to write and/or store. For example, the user data UD may include, but not be limited to, original data of an operating system (OS) and/or applications executable by the processing unit 12. Alternatively or additionally, the user data UD may include data generated by the OS and/or the applications.

In an optional or additional embodiment, the second storage region 11b may be used to store a first file system FS1. The first file system FS1 may include configuration information about the first storage region 11a of the storage device 11. For example, the first file system FS1 may include various configuration information about the first storage region 11a, such as, but not limited to, access unit information, partition information, file name information, file size information, file address information, and the like.

The processing unit 12 may be and/or may include a central processing unit (CPU) and/or an application processor (AP). In an embodiment, the processing unit 12 may execute the OS to drive the electronic device 10. Alternatively or additionally, the processing unit 12 may execute various applications.

The processing unit 12 may read the first file system FS1 that may be stored in the second storage region 11b of the storage device 11 so as to be loaded to the random access memory 13 as a second file system FS2. For example, the processing unit 12 may access the storage device 11 by using the second file system FS2. Alternatively or additionally, the processing unit 12 may update the second file system FS2. In an embodiment, the updated portion of the second file system FS2 may be applied to the first file system FS1 of the storage device 11 through a backup operation (and/or journaling).

The random access memory 13 may be configured to perform various functions such as, but not limited to, a system memory of the electronic device 10, a working memory of the processing unit 12, a buffer memory of the processing unit 12, a cache memory of the processing unit 12, and the like.

Figure 2:
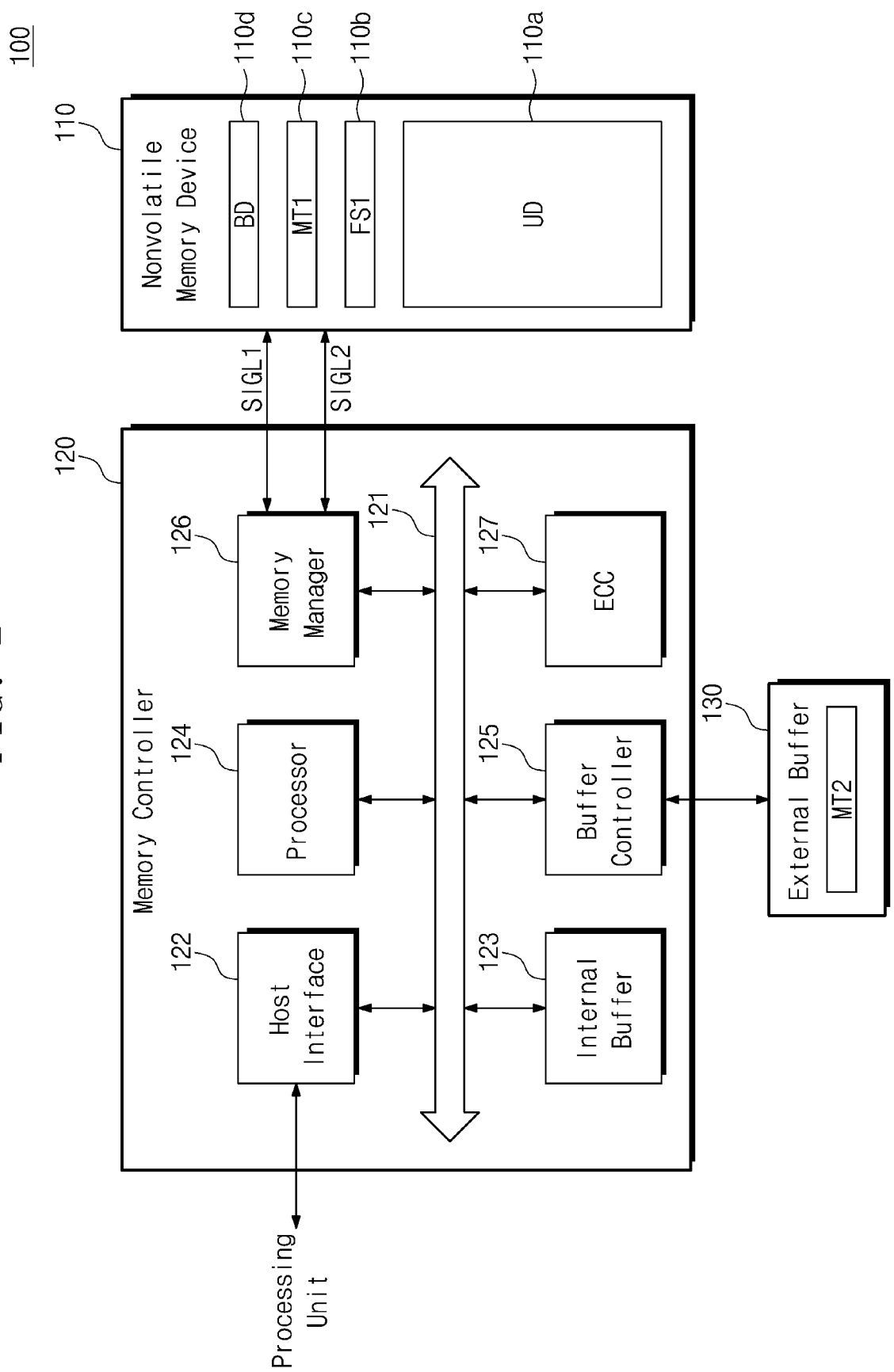
FIG. 2 illustrates a storage device, according to an embodiment of the present disclosure.

FIG. 2 illustrates a storage device 100, according to an embodiment of the present disclosure. The storage device 100 of FIG. 2 may include or may be similar in many respects to the storage device 11 described above with reference to FIG. 1, and may include additional features not mentioned above. Referring to FIG. 2, the storage device 100 may include a nonvolatile memory device 110, a memory controller 120, and an external buffer 130. The nonvolatile memory device 110 may be and/or may include a plurality of memory cells. Each memory cell of the plurality of memory cells of the nonvolatile memory device 110 may store two (2) or more bits.

In an embodiment, the nonvolatile memory device 110 may be and/or may include at least one of various nonvolatile memory devices such as, but not limited to, a flash memory device, a phase-change memory device, a ferroelectric memory device, a magnetic memory device, a resistive memory device, and the like.

The memory controller 120 may receive, from an external host device (e.g., the processing unit 12 of FIG. 1), various requests for writing data in the nonvolatile memory device 110 and/or reading data from the nonvolatile memory device 110. The memory controller 120 may store (and/or buffer) user data communicated with the processing unit 12 in the external buffer 130. Alternatively or additionally, the memory controller 120 may store meta data for managing the storage device 100 in the external buffer 130.

The memory controller 120 may access the nonvolatile memory device 110 through first signal lines SIGL1 and second signal lines SIGL2. For example, the memory controller 120 may send a command and/or an address to the nonvolatile memory device 110 through the first signal lines SIGL1. Alternatively or additionally, the memory controller 120 may exchange data with the nonvolatile memory device 110 through the first signal lines SIGL1.

As another example, the memory controller 120 may send a first control signal to the nonvolatile memory device 110 through the second signal lines SIGL2. Alternatively or additionally, the memory controller 120 may receive a second control signal from the nonvolatile memory device 110 through the second signal lines SIGL2. However, the present disclosure is not limited in this regard, and the memory controller 120 may transmit and/or receive the same and/or other signals to and/or from the nonvolatile memory device 110 through the first signal lines SIGL1 and the second signal lines SIGL2. For example, the memory controller 120 may receive a second control signal from the nonvolatile memory device 110 through the first signal lines SIGL1. As another example, the memory controller 120 may send the command and/or the address to the nonvolatile memory device 110 through the second signal lines SIGL2.

In an embodiment, the memory controller 120 may be configured to control two or more nonvolatile memory devices. In such an embodiment, the memory controller 120 may provide the first signal lines and the second signal lines for each of the two or more nonvolatile memory devices.

In an optional or additional embodiment, the memory controller 120 may share the first signal lines with respect to the two or more nonvolatile memory devices. In such an embodiment, the memory controller 120 may share some of the second signal lines with respect to the two or more nonvolatile memory devices and/or may separately provide the remaining second signal lines to the two or more nonvolatile memory devices.

The external buffer 130 may be and/or may include a random access memory. For example, the external buffer 130 may be and/or may include at least one of a dynamic RAM, a phase change RAM, a ferroelectric RAM, a magnetic RAM, a resistive RAM, and the like. That is, the present disclosure is not limited in this regard, and the external buffer 130 may be and/or may include other types of random access memory.

The nonvolatile memory device 110 may include a first storage region 110a, a second storage region 110b, a third storage region 110c, and a fourth storage region 110d. Each storage region of the first to fourth storage regions 110a to 110d may be and/or may include a plurality of memory cells.

In an embodiment, the first storage region 110a may store the user data UD. That is, the first storage region 110a may correspond to the first storage region 11a of FIG. 1. In an optional or additional embodiment, the second storage region 110b may store the first file system FS1. That is, the second storage region 110b may correspond to the second storage region 11b of FIG. 1.

In another optional or additional embodiment, the third storage region 110c may store a first map table MT1. The storage device 100 may translate physical addresses into logical addresses using the first map table MT1. For example, the processing unit 12 may transfer, to the storage device 100, write requests and/or read requests that may be based on logical addresses. However, the user data UD may be written in the first storage region 110a based on physical addresses. Consequently, the storage device 100 may translate logical addresses transferred from the processing unit 12 into physical addresses by using the first map table MT1 in order to access the first storage region 110a, in which the user data UD may be stored, by using the physical addresses. In an embodiment, the capacity of the third storage region 110c may not be identified (or recognized) by the processing unit 12 as the storage capacity of the storage device 100.

In another optional or additional embodiment, the fourth storage region 110d may store buffering data BD. For example, part or all of data to be written in the first storage region 110a may be first written in the fourth storage region 110d prior to being migrated to the first storage region 110a (e.g., at an idle time). The migration may include writing original data (e.g., data of the fourth storage region 110d) in a target region (and/or a destination region) (e.g., the first storage region 110a) and invalidating the original data (e.g., the data of the fourth storage region 110d) after the writing in the target region has been completed. In an embodiment, when the capacity of the fourth storage region 110d is insufficient, the data to be written in the first storage region 110a may be directly written in the first storage region 110a without passing through the fourth storage region 110d. In an optional or additional embodiment, the capacity of the fourth storage region 110d may be identified (or recognized) or may not be identified by the processing unit 12 as the storage capacity of the storage device 100.

The memory controller 120 may include a bus 121, a host interface 122, an internal buffer 123, a processor 124, a buffer controller 125, a memory manager 126, and an error correction code (ECC) block 127.

The bus 121 may provide communication channels between the components of the memory controller 120. In an embodiment, the host interface 122 may receive various requests from the external host device and/or may parse the received requests. Alternatively or additionally, the host interface 122 may store the parsed requests in the internal buffer 123.

In an optional or additional embodiment, the host interface 122 may send various responses to the external host device. For example, the host interface 122 may exchange signals with the external host device that may comply with one or more communication protocols (e.g., Non-Volatile Memory Express (NVMe), Peripheral Component Interconnect (PCI), PCI Express (PCIe), NVMe over Fabrics, Universal Serial Bus (USB), and the like). The internal buffer 123 may be and/or may include a RAM. For example, the internal buffer 123 may be and/or may include, but not be limited to, a static RAM, a dynamic RAM, and the like.

The processor 124 may execute an operating system and/or firmware for driving the memory controller 120. Alternatively or additionally, the processor 124 may read the parsed requests that may be stored in the internal buffer 123. In such an example, the processor 124 may generate addresses and/or commands for controlling the nonvolatile memory device 110, based on the parsed requests. The processor 124 may provide the generated commands and addresses to the memory manager 126.

The processor 124 may store various meta data for managing the storage device 100 in the internal buffer 123. In an embodiment, the processor 124 may access the external buffer 130 through the buffer controller 125. For example, the processor 124 may control the buffer controller 125 and the memory manager 126 such that the user data that may be stored in the external buffer 130 may be transferred to the nonvolatile memory device 110.

Alternatively or additionally, the processor 124 may control the host interface 122 and the buffer controller 125 such that the data that may be stored in the external buffer 130 may be transferred to the external host device. In an embodiment, the processor 124 may control the buffer controller 125 and the memory manager 126 such that the data received from the nonvolatile memory device 110 may be stored in the external buffer 130. In an optional or additional embodiment, the processor 124 may control the host interface 122 and the buffer controller 125 such that the data received from the external host device may be stored in the external buffer 130.

In an embodiment, the processor 124 may read the first map table MT1 stored in the third storage region 110c of the nonvolatile memory device 110 and may store the first map table MT1 in the external buffer 130 as a second map table MT2. The processor 124 may translate logical addresses into physical addresses by using the second map table MT2 stored in the external buffer 130. Alternatively or additionally, the processor 124 may update the second map table MT2 of the external buffer 130. In such an example, the processor 124 may apply the updated portion of the second map table MT2 to the first map table MT1 of the nonvolatile memory device 110 through a backup and/or journaling operation.

The buffer controller 125, under control of the processor 124, may write data in the external buffer 130 and/or may read data from the external buffer 130. The memory manager 126, under control of the processor 124, may communicate with the nonvolatile memory device 110 through the first signal lines SIGL1 and the second signal lines SIGL2.

The memory manager 126, under control of the processor 124, may access the nonvolatile memory device 110. For example, the memory manager 126 may access the nonvolatile memory device 110 through the first signal lines SIGL1 and the second signal lines SIGL2. The memory manager 126 may communicate with the nonvolatile memory device 110, based on one or more communication protocols that may comply with a known communication standard and/or may be defined by a manufacturer.

The error correction code block 127 may perform error correction encoding on data to be provided to the nonvolatile memory device 110 by using the error correction code ECC.

Alternatively or additionally, the error correction code block 127 may perform error correction decoding on data received from the nonvolatile memory device 110 by using the error correction code ECC.

In an embodiment, the external buffer 130 and the buffer controller 125 may be omitted in the storage device 100. When the external buffer 130 and the buffer controller 125 are omitted, the functions that are described as being performed by the external buffer 130 and the buffer controller 125 may be performed by the internal buffer 123.

For example, when the external buffer 130 and the buffer controller 125 are omitted, the processor 124 may read a portion (e.g., partial map data) of the first map table MT1 stored in the third storage region 110c of the nonvolatile memory device 110, so as to be stored in the internal buffer 123. When necessary map data is absent from the internal buffer 123, the processor 124 may read a necessary portion (e.g., necessary map data) of the first map table MT1 stored in the third storage region 110c of the nonvolatile memory device 110, so as to be stored in the internal buffer 123. When the storage capacity of the internal buffer 123 is insufficient, the processor 124 may secure (e.g., make available) the storage capacity of the internal buffer 123, which may be used to load the necessary map data, by discarding part or all of the map data previously loaded to the internal buffer 123.

Figure 3:
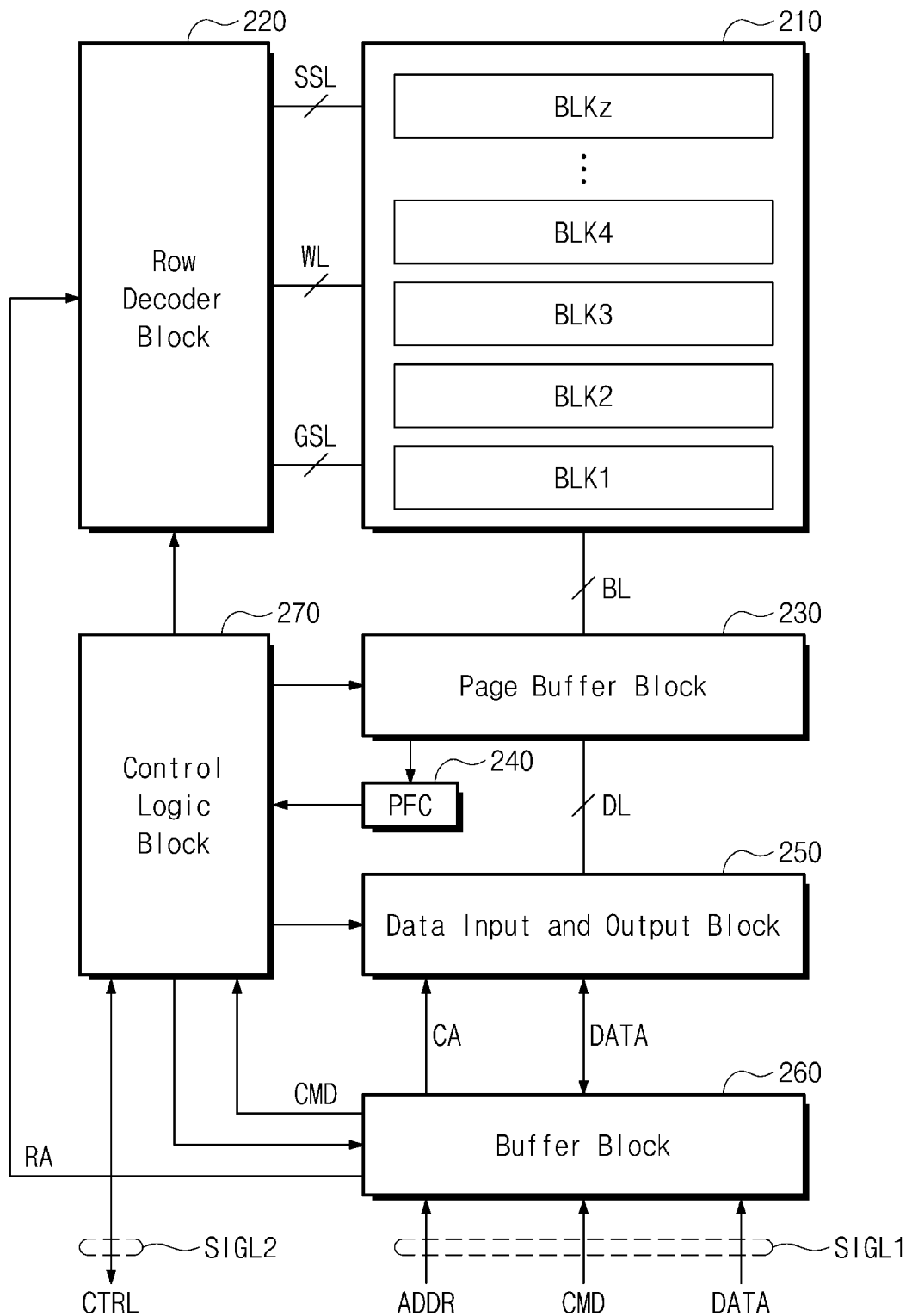
FIG. 3 is a block diagram illustrating a nonvolatile memory device, according to an embodiment of the present disclosure.

FIG. 3 is a block diagram illustrating a nonvolatile memory device 200, according to an embodiment of the present disclosure. The nonvolatile memory device 200 of FIG. 3 may be and/or may be similar in many respects to the nonvolatile memory device 110 described above with reference to FIG. 2, and may include additional features not mentioned above. Referring to FIG. 3, the nonvolatile memory device 200 may include a memory cell array 210, a row decoder block 220, a page buffer block 230, a pass/fail check block (PFC) 240, a data input and output block 250, a buffer block 260, and a control logic block 270.

The memory cell array 210 includes a plurality of memory blocks (e.g., first memory block BLK1, second memory block BLK2, third memory block BLK3, fourth memory block BLK4, to z-th memory block BLKz where z is a positive integer greater than zero (0), hereinafter generally referred to as "BLK"). Each memory block of the plurality of memory blocks BLK includes a plurality of memory cells. Each memory block of the plurality of memory blocks BLK may be connected to the row decoder block 220 through at least one ground selection line GSL, word lines WL, and at least one string selection line SSL. Some of the word lines WL may be used as dummy word lines. Each memory block of the plurality of memory blocks BLK may be connected to the page buffer block 230 through a plurality of bit lines BL. The plurality of memory blocks BLK may be connected in common to the plurality of bit lines BL.

In an embodiment, each memory block of the plurality of memory blocks BLK may be a unit of an erase operation. That is, memory cells belonging to each memory block of the plurality of memory blocks BLK may be erased at the same time. In an optional or additional embodiment, each memory block of the plurality of memory blocks BLK may be divided into a plurality of sub-blocks. In such an embodiment, each sub-block of the plurality of sub-blocks may correspond to a unit of the erase operation. In another optional or additional embodiment, two or more memory blocks of the plurality of memory blocks BLK may constitute one super block. In such an embodiment, each super block of the two or more memory blocks may correspond to a unit of the erase operation. As used herein, the unit of the erasable operation may be referred to as an erase unit. That is, the erase unit may refer to a memory block, a sub-block of a memory block, and/or a super block of memory blocks.

The row decoder block 220 may be connected to the memory cell array 210 through the ground selection lines GSL, the word lines WL, and the string selection lines SSL. In an embodiment, the row decoder block 220 may operate under control of the control logic block 270.

The row decoder block 220 may decode a row address RA received from the buffer block 260. Alternatively or additionally, the row decoder block 220 may control voltages to be applied to the string selection lines SSL, the word lines WL, and the ground selection lines GSL, based on the decoded row address.

The page buffer block 230 may be connected to the memory cell array 210 through the plurality of bit lines BL. Alternatively or additionally, the page buffer block 230 may be connected to the data input and output block 250 through a plurality of data lines DL. In an embodiment, the page buffer block 230 may operate under control of the control logic block 270.

In the program operation, the page buffer block 230 may store data to be written in memory cells. For example, during the program operation, the page buffer block 230 may apply voltages to the plurality of bit lines BL based on the stored data. As another example, the page buffer block 230, during a read operation and/or a verify read operation that may be performed in the program operation and/or the erase operation, may sense voltages of the bit lines BL and may store a sensing result.

The pass/fail check block 240 may verify the sensing result of the page buffer block 230, in the verify read operation that may be performed in the program operation and/or the erase operation. For example, in the verify read operation that may be performed in the program operation, the pass/fail check block 240 may count the number of values (e.g., zero, "0") corresponding to on-cells that may not be programmed to a target threshold voltage or higher.

In the verify read operation that may be performed in the erase operation, the pass/fail check block 240 may count the number this values (e.g., one, "1") corresponding to off-cells that may not be erased to a target threshold voltage or lower. When the counting result is greater than or equal to a threshold value, the pass/fail check block 240 may output a fail signal to the control logic block 270. Alternatively or additionally, when the counting result is smaller than the threshold value, the pass/fail check block 240 may output a pass signal to the control logic block 270. Depending on the verification result of the pass/fail check block 240, a program loop of the program operation may be further performed, and/or an erase loop of the erase operation may be further performed. For example, one or more program loops may be further performed until the pass/fail check block 240 outputs a pass signal to the control logic block 270 and/or the number of executions of the program loop exceeds a threshold. As another example, one or more erase loops may be further performed until the pass/fail check block 240 outputs a pass signal to the control logic block 270 and/or a number of executions of the erase loop exceeds a threshold.

The data input and output block 250 may be connected to the page buffer block 230 through the plurality of data lines DL. In an embodiment, the data input and output block 250 may receive a column address CA from the buffer block 260. Alternatively or additionally, the data input and output block 250 may output the data read by the page buffer block 230 to the buffer block 260 depending on the column address CA. For example, the data input and output block 250 may provide the data received from the buffer block 260 to the page buffer block 230, based on the column address CA.

In an embodiment, the buffer block 260 may receive, from an external device through the first signal lines SIGL1, a command CMD and/or an address ADDR. Alternatively or additionally, the buffer block 260 may exchange data DATA with the external device through the first signal lines SIGL1. In an embodiment, the buffer block 260 may operate under control of the control logic block 270. The buffer block 260 may provide the command CMD to the control logic block 270. The buffer block 260 may provide the row address RA of the address ADDR to the row decoder block 220 and/or may provide the column address CA of the address ADDR to the data input and output block 250. The buffer block 260 may exchange the data DATA with the data input and output block 250.

The control logic block 270 may exchange a control signal CTRL with the external device through the second signal lines SIGL2. The control logic block 270 may allow the buffer block 260 to route the command CMD, the address ADDR, and the data DATA. The control logic block 270 may decode the command CMD received from the buffer block 260 and/or may control the nonvolatile memory device 200 based on the decoded command.

In an embodiment, the nonvolatile memory device 200 may be manufactured using a bonding method. For example, the memory cell array 210 may be manufactured by using a first wafer, and the row decoder block 220, the page buffer block 230, the data input and output block 250, the buffer block 260, and the control logic block 270 may be manufactured by using a second wafer. In such an example, the nonvolatile memory device 200 may be implemented by coupling the first wafer and the second wafer such that an upper surface of the first wafer and an upper surface of the second wafer face each other.

In an optional or additional embodiment, the nonvolatile memory device 200 may be manufactured in a cell over peri (COP) method. In such an embodiment, a peripheral circuit that may include the row decoder block 220, the page buffer block 230, the data input and output block 250, the buffer block 260, and the control logic block 270 may be implemented on a substrate. Alternatively or additionally, the memory cell array 210 may be implemented over the peripheral circuit. In such an embodiment, the peripheral circuit and the memory cell array 210 may be connected by using through vias.

Figure 4:
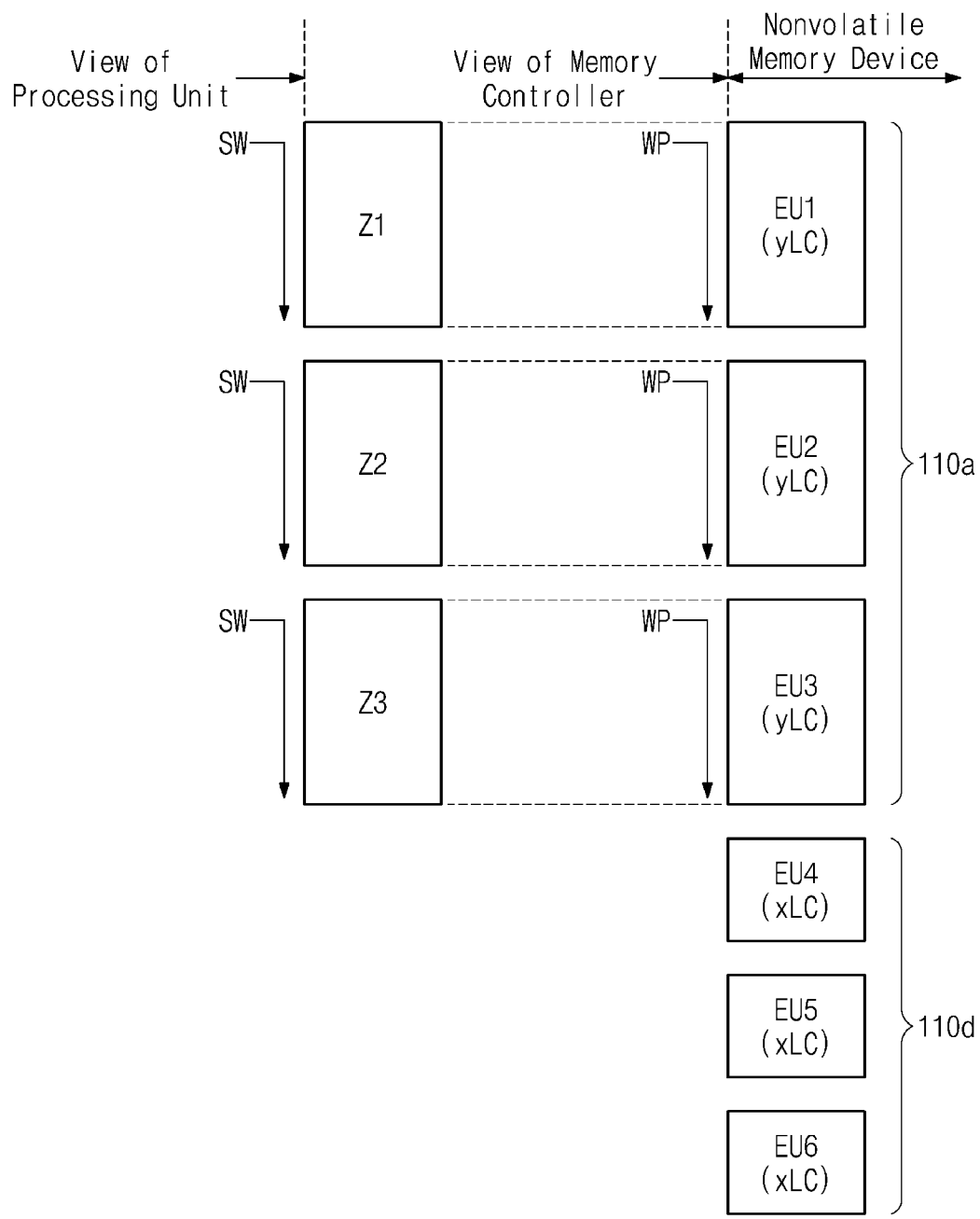
FIG. 4 illustrates an example in which a processing unit allocates zones to a storage device, according to an embodiment of the present disclosure.

FIG. 4 illustrates examples in which the processing unit 12 allocates zones to storage device (e.g., storage device 11 of FIG. 1, storage device 100 of FIG. 2), according to an embodiment of the present disclosure. Referring to FIGS. 1-4, in view of the processing unit 12, the processing unit 12 may open zones in the first storage region 110*a* of the storage device 100. For example, in the initialization operation, the storage device 100 may provide the processing unit 12 with information about a storage capacity of the erase unit of the first storage region 110*a*. The processing unit 12 may open zones based on the storage capacity of the erase unit of the first storage region 110*a*.

When the processing unit 12 opens the zones, in view of the memory controller 120, the memory controller 120 of the storage device 100 may allocate zones to the erase units of the nonvolatile memory device 110, respectively. For example, the processing unit 12 may transfer open requests of a first zone Z1, a second zone Z2, and a third zone Z3 for the first storage region 110*a* of the storage device 100 to the memory controller 120. The memory controller 120 may allocate the first zone Z1, the second zone Z2, and the third zone Z3 to a first erase unit EU1, a second erase unit EU2, and a third erase unit EU3 of the nonvolatile memory device 110, respectively.

Each of the first erase unit EU1, the second erase unit EU2, and the third erase unit EU3 may include a plurality of memory cells that are used as a y-level cell yLC, where y is a positive integer greater than zero (0). For example, each memory cell that is used as the y-level cell yLC may store y bits.

The processing unit 12 may independently access (e.g., perform the write and/or read operation on) the first zone Z1, the second zone Z2, and the third zone Z3. The processing unit 12 may perform only a sequential write SW, different from a random write, in each of the first zone Z1, the second zone Z2, and the third zone Z3. For example, the processing unit 12 may write data in each of the first zone Z1, the second zone Z2, and the third zone Z3, based on sequential logical addresses. In an embodiment, the first zone Z1, the second zone Z2, and the third zone Z3 may respectively correspond to different applications that are executable by the processing unit 12.

In response to the sequential write SW of the processing unit 12, the memory controller 120 may manage a write pointer WP for each of the first erase unit EU1 allocated for the first zone Z1, the second erase unit EU2 allocated for the second zone Z2, and the third erase unit EU3 allocated for the third zone Z3. A write pointer may point out a next position (e.g., a page) where data is to be written.

For example, as data is written at a page pointed out by the write pointer WP, the memory controller 120 may update the write pointer WP so as to indicate a next page. That is, the data written in each of the first erase unit EU1, the second erase unit EU2, and the third erase unit EU3 may correspond to sequential physical addresses. Accordingly, the data that the processing unit 12 writes in each of the first zone Z1, the second zone Z2, and the third zone Z3 may correspond to sequential logical addresses and sequential physical addresses.

The data that the processing unit 12 requests to be written in each of the first zone Z1, the second zone Z2, and the third zone Z3 may be designated to be finally written in each of the first erase unit EU1, the second erase unit EU2, and the third erase unit EU3 respectively corresponding to the first zone Z1, the second zone Z2, and the third zone Z3. In an embodiment, the description may be given as each zone is allocated to one erase unit, but the number of erase units allocated for each zone may be two or more.

Before the data that the processing unit 12 requests to be written in each of the first zone Z1, the second zone Z2, and the third zone Z3 may be finally written in each of the first erase unit EU1, the second erase unit EU2, and the third erase unit EU3 respectively corresponding to the first zone Z1, the second zone Z2, and the third zone Z3, the memory controller 120 may buffer the write data by using erase units of the fourth storage region 110*d*.

For example, the memory controller 120 may use a fourth erase unit EU4, a fifth erase unit EU5, and a sixth erase unit EU6 of the fourth storage region 110*d* for buffering. The memory controller 120 may use memory cells of the fourth erase unit EU4, the fifth erase unit EU5, and the sixth erase unit EU6 of the fourth storage region 110*d*, which may be used for buffering, as an x-level cell xLC, where x may be a positive integer greater than zero (0) and less than y.

In an embodiment, the storage capacity of the x-level cell xLC may be smaller than the storage capacity of the y-level cell yLC. Accordingly, as shown in FIG. 4, the size of each of the fourth erase unit EU4, the fifth erase unit EU5, and the sixth erase unit EU6 of the fourth storage region 110d may be smaller than the size of each of the first erase unit EU1, the second erase unit EU2, and the third erase unit EU3.

In an optional or additional embodiment, the write speed of the x-level cell xLC may be faster than the write speed of the y-level cell yLC. Accordingly, the write speed of the fourth erase unit EU4, the fifth erase unit EU5, and the sixth erase unit EU6 of the fourth storage region 110d used for buffering may be faster than the write speed of the first erase unit EU1, the second erase unit EU2, and the third erase unit EU3 in which the data may finally be written. Consequently, the write speed of the storage device 100 may be improved by performing buffering by using the fourth storage region 110d.

In an embodiment, the data that may finally be written in the first erase unit EU1, the second erase unit EU2, and the third erase unit EU3 respectively corresponding to the first zone Z1, the second zone Z2, and the third zone Z3 may be managed under a leading control of the processing unit 12. For example, except for the case where a read reclaim may be needed due to occurrence of a bad block and/or a reduction of reliability, a data management operation such as, but not limited to, data copy, data discard (e.g., invalidation or zone reset) of a zone unit, and garbage collection of a zone unit, may be performed by the processing unit 12.

The data written (and/or buffered) in the fourth erase unit EU4, the fifth erase unit EU5, and the sixth erase unit EU6 of the fourth storage region 110d may be managed by a leading control of the memory controller 120. For example, even without an explicit request from the processing unit 12, the memory controller 120 may internally perform data copy, data garbage collection, and/or data migration with respect to the fourth erase unit EU4, the fifth erase unit EU5, and the sixth erase unit EU6.

Figure 5:
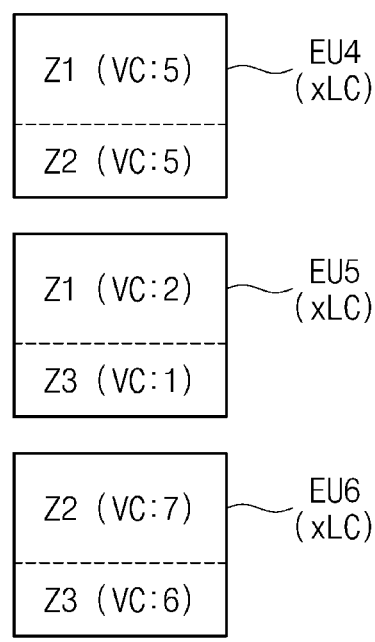
FIG. 5 illustrates a first example in which data of zones are buffered in erase units, according to an embodiment of the present disclosure.

FIG. 5 illustrates a first example in which data of zones are buffered in erase units, according to an embodiment of the present disclosure. Referring to FIGS. 1, 2, and 5, the memory controller 120 may buffer data of the first zone Z1 and data of the second zone Z2 in the fourth erase unit EU4 including memory cells used as the x-level cell xLC. For example, as shown in FIG. 5, a valid page count VC of the data of the first zone Z1 of the fourth erase unit EU4 may be five (5). Alternatively or additionally, as further shown in FIG. 5, a valid page count VC of the data of the second zone Z2 of the fourth erase unit EU4 may be five (5).

The memory controller 120 may buffer data of the first zone Z1 and data of the third zone Z3 in the fifth erase unit EU5 including memory cells used as the x-level cell xLC. For example, as shown in FIG. 5, a valid page count VC of the data of the first zone Z1 of the fifth erase unit EU5 may be two (2). Alternatively or additionally, as further shown in FIG. 5, a valid page count VC of the data of the third zone Z3 of the fifth erase unit EU5 may be one (1).

The memory controller 120 may buffer data of the second zone Z2 and data of the third zone Z3 in the sixth erase unit EU6 including memory cells used as the x-level cell xLC. For example, as shown in FIG. 5, a valid page count VC of the data of the second zone Z2 of the sixth erase unit EU6 may be seven (7). Alternatively or additionally, as further shown in FIG. 5, a valid page count VC of the data of the third zone Z3 of the sixth erase unit EU6 may be six (6).

In an embodiment, it may be assumed that invalid data of other zones may be stored at the remaining storage spaces of the fourth erase unit EU4, the fifth erase unit EU5, and the sixth erase unit EU6, for example, the remaining pages thereof.

As shown in FIG. 5, in a state where data may be written in the fourth erase unit EU4, the fifth erase unit EU5, and the sixth erase unit EU6, the memory controller 120 may perform garbage collection (e.g., internally without intervention of the processing unit 12) for the purpose of securing (e.g., making available) a free erase unit of the fourth storage region 110d. For example, the memory controller 120 may select the fifth erase unit EU5, in which the number of valid pages may be the smallest, as a victim erase unit of garbage collection. In an embodiment, the victim erase unit may be invalidated by garbage collection. That is, the invalidated erase unit may be changed to a free erase unit by the erase operation.

Figure 6:
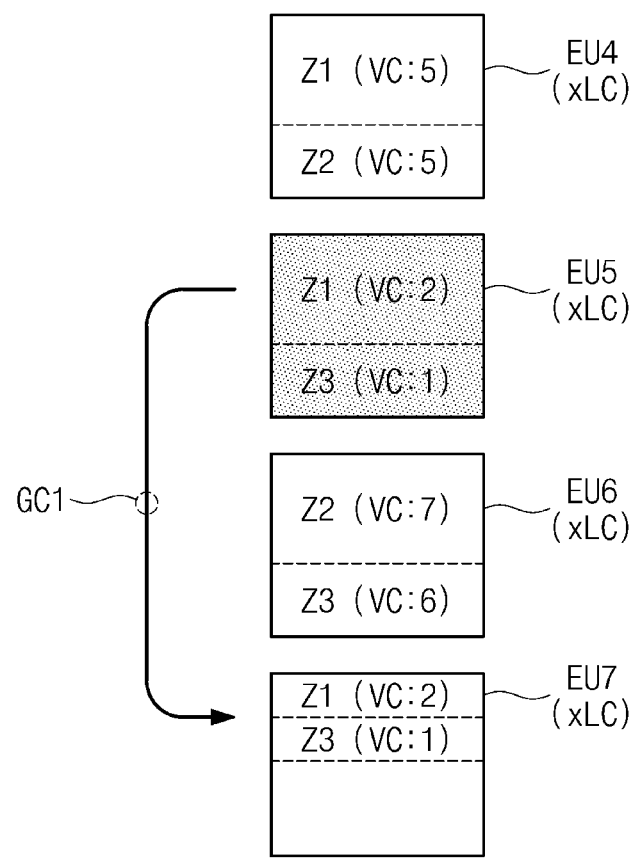
FIG. 6 illustrates an example in which a memory controller performs garbage collection with respect to a fifth erase unit, according to an embodiment of the present disclosure.

FIG. 6 illustrates an example in which a memory controller performs garbage collection with respect to the fifth erase unit EU5, according to an embodiment of the present disclosure. In an embodiment, first garbage collection GC1 may be internally performed by the memory controller 120 without intervention of the processing unit 12. When the first garbage collection GC1 is performed, logical addresses of data that are copied by garbage collection may be maintained, and/or physical addresses thereof may be changed.

Referring to FIGS. 1, 2, and 6, the memory controller 120 may copy two (2) valid data of the first zone Z1 of the fifth erase unit EU5 and one (1) valid data of the third zone Z3 of the fifth erase unit EU5 to a seventh erase unit EU7 through the first garbage collection GC1. Alternatively or additionally, the first garbage collection GC1 may invalidate the data of the first zone Z1 of the fifth erase unit EU5 and data of the third zone Z3 of the fifth erase unit EU5.

The processing unit 12 may perform zone-based garbage collection based on sequentiality of logical addresses and physical addresses that are maintained with regard to the first zone Z1, the second zone Z2, and the third zone Z3. For example, the processing unit 12 may add at least two zones to generate a new zone and may invalidate (and/or reset) the at least two zones.

Figure 7:
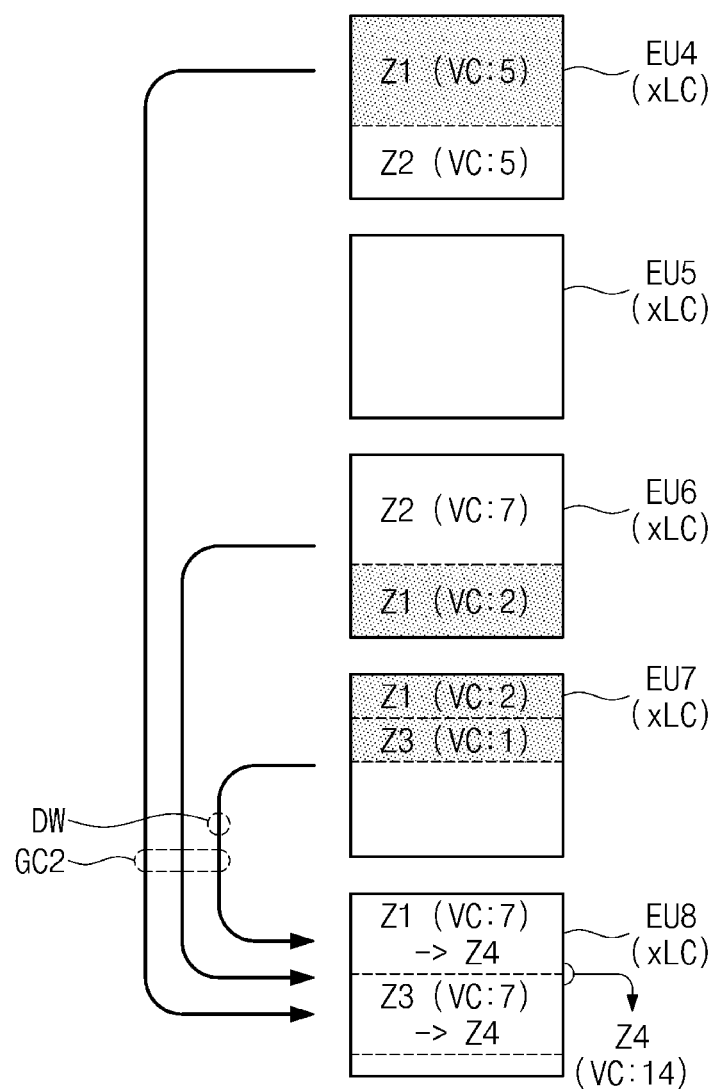
FIG. 7 illustrates an example in which a processing unit performs garbage collection with respect to a first zone and a third zone, according to an embodiment of the present disclosure.

FIG. 7 illustrates an example in which the processing unit 12 performs garbage collection with respect to the first zone Z1 and the third zone Z3, according to an embodiment of the present disclosure. In an embodiment, the processing unit 12 may perform the second garbage collection GC2 without a request of the memory controller 120. When the second garbage collection GC2 is performed, logical addresses of data that are copied by garbage collection may be changed, and/or physical addresses thereof may also be changed.

Referring to FIGS. 1, 2, and 7, the processing unit 12 may request (and/or instruct) the memory controller 120 to read data of the first zone Z1 and/or data of the third zone Z3. Based on the request, the memory controller 120 may read data of the first zone Z1 corresponding to the valid page count VC of five (5) from the fourth erase unit EU4 and/or may read data of the first zone Z1 corresponding to the valid page count VC of two (2) from the seventh erase unit EU7. Alternatively or additionally, the memory controller 120 may read data of the third zone Z3 corresponding to the valid page count VC of six (6) from the sixth erase unit EU6 and/or may read data of the third zone Z3 corresponding to the valid page count VC of one (1) from the seventh erase unit EU7. The memory controller 120 may transfer the read data to the processing unit 12.

In an embodiment, the processing unit 12 may transfer an open request of a new zone to the memory controller 120. Alternatively or additionally, the processing unit 12 may request the memory controller 120 to write the data of the first zone Z1 and the data of the third zone Z3 read by the memory controller 120 in a new zone, for example, a fourth zone Z4.

The memory controller 120 may allocate an erase unit, which may include memory cells used as the y-level cell yLC of the first storage region 110a, to the fourth zone Z4. In an embodiment, the memory controller 120 may buffer the data write-requested by the processing unit 12 as a portion of the second garbage collection GC2 in an eighth erase unit EU8 of the fourth storage region 110d.

Data obtained from the first zone Z1 having a valid page count VC of seven (7) and data obtained from the third zone Z3 having the valid page count VC of seven (7) may be written in the eighth erase unit EU8 as data of the fourth zone Z4 having the valid page count VC of fourteen (14). Subsequently, the data of the first zone Z1 of the fourth erase unit EU4, the data of the first zone Z1 of the seventh erase unit EU7, the data of the third zone Z3 of the sixth erase unit EU6, and the data of the third zone Z3 of the seventh erase unit EU7 may be invalidated by the second garbage collection GC2.

As described with reference to FIGS. 6 and 7, a double write DW may occur when the first garbage collection GC1 of the memory controller 120 based on the erase unit and the second garbage collection GC2 of the processing unit 12 based on the zone unit are performed independently of each other. For example, the data of the first zone Z1 and the data of the third zone Z3, which may be copied to the seventh erase unit EU7 by the first garbage collection GC1 in FIG. 5, may again be copied to the eighth erase unit EU8 by the second garbage collection GC2. The double write DW may act as the write amplification factor WAF.

The electronic device 10, according to an embodiment of the present disclosure, may perform garbage collection based on placement information indicating how data are placed in erase units of the nonvolatile memory device 110. Accordingly, the write amplification factor WAF such as the double write DW may be prevented. Consequently, the lifetime and reliability of the electronic device 10 and the storage device 100 may be improved.

Figure 8:
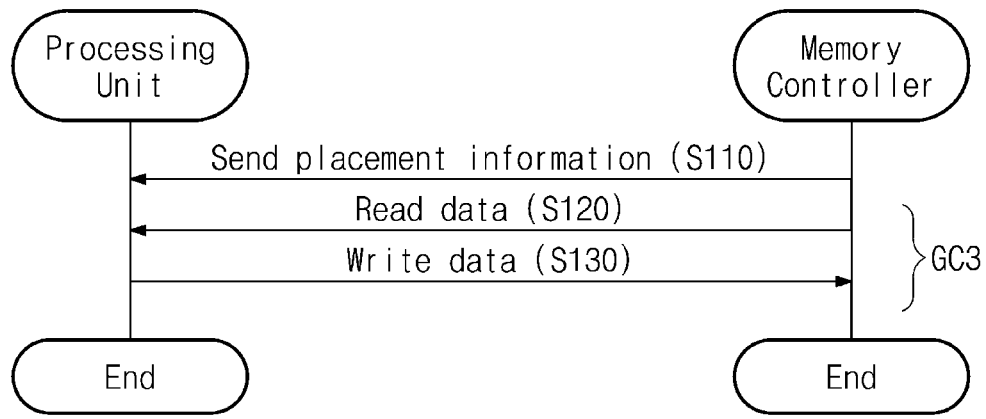
FIG. 8 illustrates an example in which an electronic device performs garbage collection, according to an embodiment of the present disclosure.

FIG. 8 illustrates an example in which the electronic device 10 performs garbage collection, according to an embodiment of the present disclosure. Referring to FIGS. 1, 2, and 8, in operation S110, the memory controller 120 may send placement information to the processing unit 12. For example, the placement information may include information about a state where data that the processing unit 12 writes in zones have been written and placed in erase units of the fourth storage region 110d.

In operation S120, the processing unit 12 may read data for a third garbage collection GC3 from the nonvolatile memory device 110 through the memory controller 120. In operation S130, the processing unit 12 may write the data for the third garbage collection GC3 in the nonvolatile memory device 110 through the memory controller 120.

In an embodiment, the third garbage collection GC3 may be garbage collection that may be performed by the processing unit 12 in units of zone, based on the placement information. The third garbage collection GC3 may cause a change of logical addresses of data to be copied by the third garbage collection GC3. Alternatively or additionally, the third garbage collection GC3 may cause a change of physical addresses thereof.

In an embodiment, because the third garbage collection GC3 may need to open a new zone, at an arbitrary time between operation S110 and operation S130, the processing unit 12 may send a zone open request to the memory controller 120. Alternatively or additionally, the processing unit 12 may allow a zone to be automatically opened by sending the write request for a start logical address of a new zone to the memory controller 120 in operation S130.

In an embodiment, the processing unit 12 may send one zone copy request to the memory controller 120 instead of sending the read request (operation S120) and the write request (operation S130) to the memory controller 120. The zone copy request may include information about a victim zone (and/or a source zone) and information about a new zone (and/or a destination zone).

Figure 9:
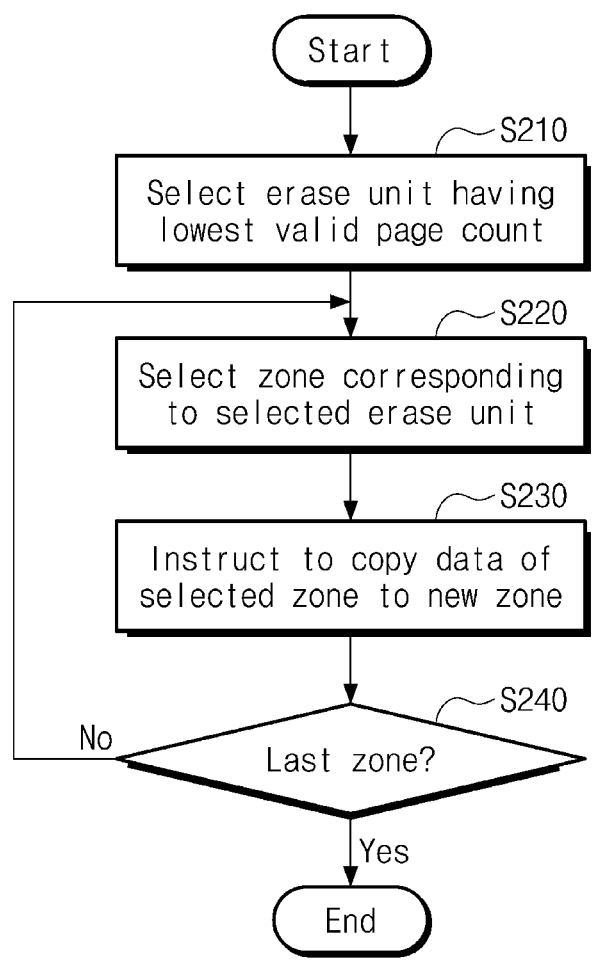
FIG. 9 illustrates a first example of a process where a processing unit performs third garbage collection, according to an embodiment of the present disclosure.

FIG. 9 illustrates a first example of a process where the processing unit 12 performs the third garbage collection GC3, according to an embodiment of the present disclosure. Referring to FIGS. 1, 2, and 9, in operation S210, the processing unit 12 may select an erase unit whose valid page count is the lowest. For example, as described with reference to FIG. 5, the processing unit 12 may select the fifth erase unit EU5 whose valid page count VC is a total of three (3) being the lowest, as a victim erase unit.

In operation S220, the processing unit 12 may select a zone corresponding to the selected erase unit. For example, the processing unit 12 may select one of the first zone Z1 and the third zone Z3 corresponding to the fifth erase unit EU5 thus selected, as a victim zone.

In operation S230, the processing unit 12 may instruct the memory controller 120 to copy data of the selected zone (e.g., the victim zone) to a new zone.

When the data of the selected zone is copied (e.g., the copy operation has completed), in operation S240, the processing unit 12 may determine whether the selected zone is the last zone. For example, the processing unit 12 may determine whether garbage collection of all zones corresponding to the victim erase unit has been completed. When the selected zone is the last zone (Yes in operation S240), the processing unit 12 may end the third garbage collection GC3.

When the selected zone is not the last zone (No in operation S240), in operation S220, the processing unit 12 may select a next zone among the zones of the victim erase unit as a victim zone. In operation S230, the processing unit 12 may instruct the memory controller 120 to perform the third garbage collection GC3 with respect to data of the selected zone.

Figure 10:
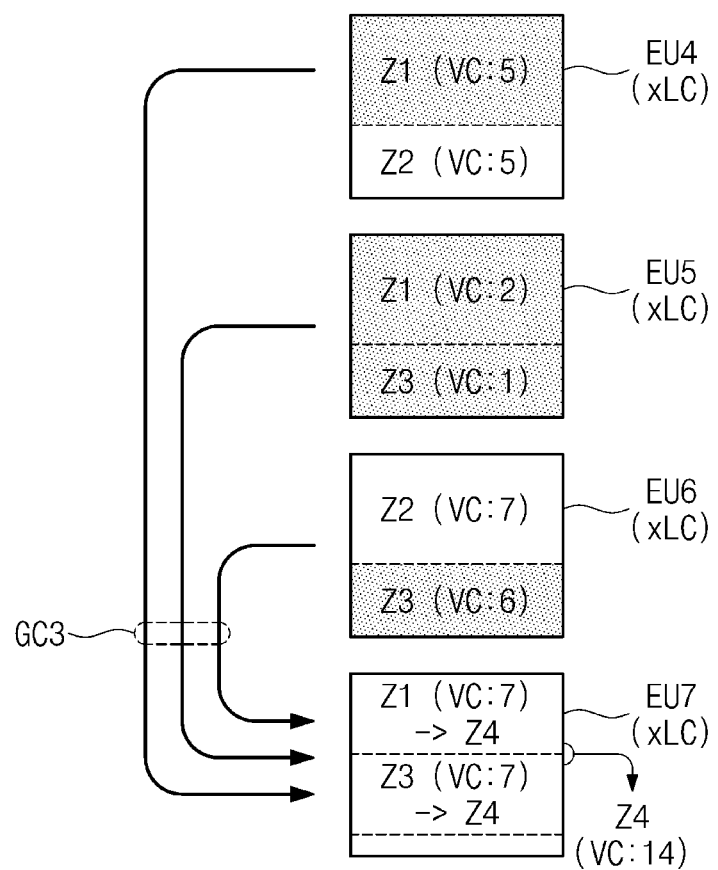
FIG. 10 illustrates an example in which an electronic device performs third garbage collection, according to an embodiment of the present disclosure.

FIG. 10 illustrates an example in which the electronic device 10 performs third garbage collection, according to an embodiment of the present disclosure. Referring to FIGS. 1, 2, 5, 9, and 10, the processing unit 12 may select the fifth erase unit EU5 having the lowest valid page count VC as a victim erase unit, as described with reference to operation S210 of FIG. 9.

As the fifth erase unit EU5 may be selected as the victim erase unit, the processing unit 12 may select the first zone Z1 and the third zone Z3 corresponding to data written in the fifth erase unit EU5 as victim erase units, as described with reference to operation S220 of FIG. 9.

The processing unit 12 may request (and/or instruct) the memory controller 120 to copy (and/or read and write) data of the first zone Z1 and data of the third zone Z3. The memory controller 120 may read data of the first zone Z1 corresponding to the valid page count VC of five (5) from the fourth erase unit EU4 and/or may read data of the first zone Z1 corresponding to the valid page count VC of two (2) from the fifth erase unit EU5.

Alternatively or additionally, the memory controller 120 may read data of the third zone Z3 corresponding to the valid page count VC of one (1) from the fifth erase unit EU5 and/or may read data of the third zone Z3 corresponding to the valid page count VC of seven (7) from the sixth erase unit EU6. In an embodiment, the memory controller 120 may transfer the read data to the processing unit 12.

The processing unit 12 may transfer the open request of a new zone to the memory controller 120. The processing unit 12 may request the memory controller 120 to write the data of the first zone Z1 and the data of the third zone Z3 read by the memory controller 120 in a new zone, for example, the fourth zone Z4.

The memory controller 120 may allocate an erase unit, which may include memory cells used as the y-level cell yLC of the first storage region 110a, to the fourth zone Z4. In an embodiment, the memory controller 120 may buffer the data write-requested by the processing unit 12 as a portion of the second garbage collection GC2 in the seventh erase unit EU7 of the fourth storage region 110d.

Data obtained from the first zone Z1 having a valid page count VC of seven (7) and data obtained from the third zone Z3 having a valid page count VC of seven (7) may be written in the seventh erase unit EU7 as data of the fourth zone Z4 having the valid page count VC of fourteen (14). Subsequently, the data of the first zone Z1 of the fourth erase unit EU4, the data of the first zone Z1 of the fifth erase unit EU5, the data of the third zone Z3 of the fifth erase unit EU5, and the data of the third zone Z3 of the sixth erase unit EU6 may be invalidated by the third garbage collection GC3.

Compared to the embodiments described with reference to FIG. 7, the double write DW may be prevented in the embodiment of FIG. 10. Accordingly, the write amplification factor WAF of the electronic device 10 may be prevented.

The embodiments described above may indicate that the data of the first zone Z1 and the data of the third zone Z3 may copied to the same zone, that is, the fourth zone Z4. However, the present disclosure is not limited in this regard, and the data of the first zone Z1 and the data of the third zone Z3 may be copied to other zones. For example, the data of the first zone Z1 may be copied to one new zone independently or together with data of any other zone, and the data of the third zone Z3 may be copied to another new zone independently or together with data of any other zone. Since the seventh erase unit EU7 belongs to the fourth storage region 110d storing the buffering data BD, the seventh erase unit EU7 may buffer data belonging to different zones together.

The embodiments described above may indicate that the processing unit 12 performs the third garbage collection GC3 by reading data from the nonvolatile memory device 110 through the memory controller 120 and writing the data in the nonvolatile memory device 110 through the memory controller 120. However, the present disclosure is not limited in this regard, and the third garbage collection GC3 may be performed in other manners. For example, the processing unit 12 may perform the third garbage collection GC3 by sending the zone copy request to the memory controller 120. The zone copy request may include information about one or more victim zones and information about a zone (e.g., a target zone) to which data is to be copied. The data that may be copied by the third garbage collection GC3 may be transferred from the victim zone to the target zone by the memory controller 120 without being transferred to the processing unit 12.

Because the data of the victim zone may be written in a new zone by the third garbage collection GC3, logical addresses of the data may be changed. Alternatively or additionally, because the data of the victim zone may be written in a new erase unit by the third garbage collection GC3, physical addresses of the data may be changed.

In an embodiment, the processing unit 12 may perform the second garbage collection GC2 and the third garbage collection GC3 independently of each other. For example, when garbage collection of one or more zones whose placement information does not exist is needed, the processing unit 12 may perform the second garbage collection GC2. When garbage collection of one or more zones whose placement information exists is needed, the processing unit 12 may perform the third garbage collection GC3.

Figure 11:
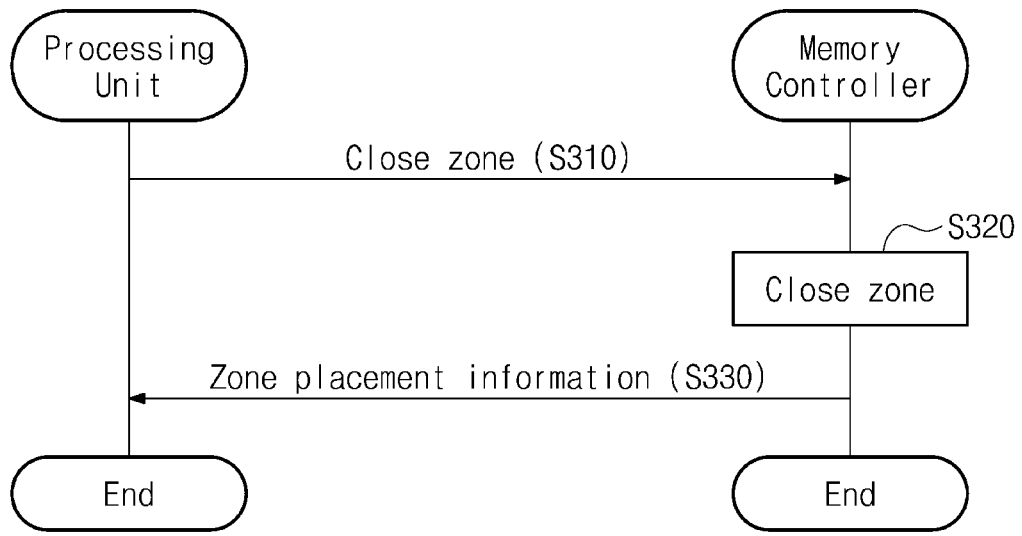
FIG. 11 illustrates a first example in which a memory controller provides placement information to a processing unit, according to an embodiment of the present disclosure.

FIG. 11 illustrates a first example in which the memory controller 120 provides placement information to the processing unit 12, according to an embodiment of the present disclosure. Referring to FIGS. 1, 2, and 11, in operation S310, the processing unit 12 may send a zone close request to memory controller 120.

The memory controller 120 may receive the zone close request and may close a zone in operation S220. For example, the memory controller 120 may prohibit an additional write for the close-requested zone.

After the zone is closed, in operation S330, the memory controller 120 may send placement information about the closed zone to the processing unit 12. The zone placement information may include information about data being present in the fourth storage region 110d from among the data of the closed zone or data migrated (e.g., background migrated) to the first storage region 110a by the memory controller 120.

The zone placement information may include a start logical address of data being buffered in the fourth storage region 110d from among the data to be written in the erase unit of the first storage region 110a allocated to the closed zone. The zone placement information may further include a length (e.g., a length from the above start logical address) of data being buffered in the fourth storage region 110d from among the data to be written in the erase unit of the first storage region 110a allocated to the closed zone. The zone placement information may further include an identifier of an erase unit of the fourth storage region 110d buffering the data to be written in the erase unit of the first storage region 110a allocated to the closed zone. The zone placement information may further include a block offset (e.g., a start physical address) of the erase unit of the fourth storage region 110d buffering the data to be written in the first storage region 110a allocated to the closed zone. The zone placement information may further include a valid page count of data of a corresponding zone written in the erase unit of the fourth storage region 110d buffering the data to be written in the erase unit of the first storage region 110a allocated to the closed zone.

In an embodiment, the data written in the first storage region 110a may have sequential logical addresses and/or may have sequential physical addresses, and as such, the start physical address may include information about data migrated (e.g., background migrated) to the erase unit of the first storage region 110a by the memory controller 120.

That is, the electronic device 10 and the storage device 100 may perform the third garbage collection GC3 with respect to a zone of the fourth storage region 110d, in which at least a portion of data of a closed zone is being buffered.

In an embodiment, when a storage capacity of a zone is full due to the write request of the processing unit 12, the memory controller 120 may automatically close the zone. In an optional or additional embodiment, when the zone is automatically closed, the memory controller 120 may send placement information to the processing unit 12.

Figure 12:
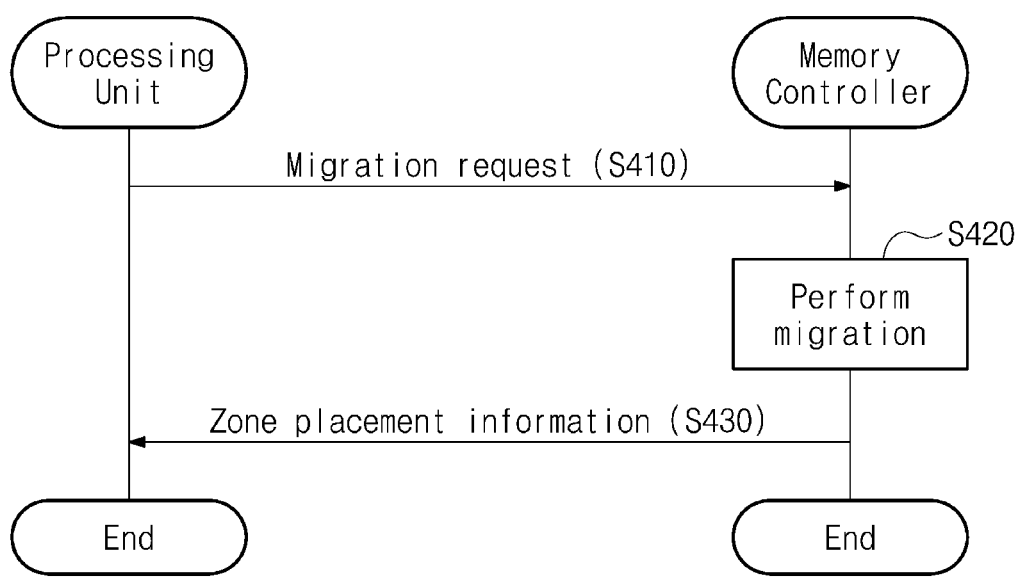
FIG. 12 illustrates a second example in which a memory controller provides placement information to a processing unit, according to an embodiment of the present disclosure.

FIG. 12 illustrates a second example in which the memory controller 120 provides placement information to the processing unit 12, according to an embodiment of the present disclosure. Referring to FIGS. 1, 2, and 12, in operation S410, the processing unit 12 may send a migration request to memory controller 120. In an embodiment, the processing unit 12 may be permitted to send the migration request for a closed zone.

In operation S420, the memory controller 120 may perform migration. For example, the memory controller 120 may migrate data being buffered in one or more erase units of the fourth storage region 110d from among data to be written in an erase unit of the first storage region 110a allocated to a zone to the erase unit of the first storage region 110a. For example, data corresponding to sequential logical addresses may be written at sequential physical addresses. That is, the sequentiality (or continuity) of logical addresses and physical addresses may be guaranteed in the erase unit of the first storage region 110a allocated to the zone.

In operation S430, the memory controller 120 may send zone placement information to the processing unit 12. The zone placement information may indicate that the data of the zone corresponding to the migration request may be finally written in the corresponding erase unit of the first storage region 110a.

In an embodiment, the processing unit 12 may perform the third garbage collection GC3 based on the zone placement information, regardless of the migrated zone. For example, the data of the zone finally written in the corresponding erase unit of the first storage region 110a may be excluded from a target of the third garbage collection GC3. Alternatively or additionally, the processing unit 12 may select the migrated zone as a target of the second garbage collection GC2.

In an embodiment, independently of migration that may be performed by the request of the processing unit 12, the memory controller 120 may internally perform migration (e.g., background migration). The memory controller 120 may migrate data of a zone being buffered in the one or more erase units of the fourth storage region 110d and/or data of a closed zone being buffered in the one or more erase units of the fourth storage region 110d to the corresponding zone of the first storage region 110a at an idle time, without an explicit request of the processing unit 12. In an embodiment, the background migration may be enabled and/or disabled by configuration settings and/or by design constraints.

When an explicit migration request for the data of the closed zone is received from the processing unit 12, the memory controller 120 may migrate the data of the closed zone being buffered in the one or more erase units of the fourth storage region 110d to the corresponding zone of the first storage region 110a at the idle time.

When migration of a specific zone is completed based on the migration request of the processing unit 12 and/or based on the background migration, as described with reference to FIG. 12, the memory controller 120 may send the zone placement information to the processing unit 12.

Figure 13:
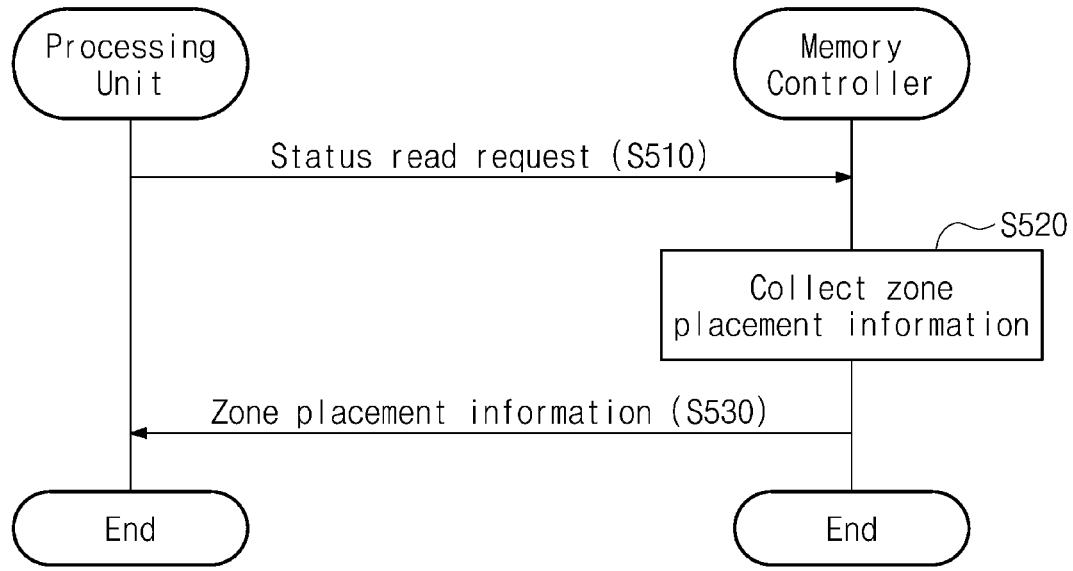
FIG. 13 illustrates a third example in which a memory controller provides placement information to a processing unit, according to an embodiment of the present disclosure.

FIG. 13 illustrates a third example in which the memory controller 120 provides placement information to the processing unit 12, according to an embodiment of the present disclosure. Referring to FIGS. 1, 2, and 13, in operation S510, the processing unit 12 may send a status read request to memory controller 120. For example, the status read request may be and/or may include a self-monitoring, analysis and reporting technology (SMART) request.

In operation S520, the memory controller 120 may collect zone placement information. For example, the memory controller 120 may collect zone placement information about one or more zones designated by the status read request and/or zone placement information about all zones of the fourth storage region 110d, which buffer data.

In operation S530, the memory controller 120 may send the zone placement information to the processing unit 12.

In an embodiment, as the processing unit 12 organizes the erase units of the fourth storage region 110d through the third garbage collection GC3, the processing unit 12 may request the memory controller 120 to collect the zone placement information about all the zones when intending to increase the performance of the storage device 100 (e.g., make the performance relatively high).

In an optional or additional embodiment, when a specific application repeatedly updates data, the processing unit 12 may request zone placement information about a specific zone corresponding to the specific application from the memory controller 120. The processing unit 12 may identify valid data and/or invalid data among the data of the specific zone being buffered in the fourth storage region 110d based on the zone placement information. Alternatively or additionally, the processing unit 12 may perform the third garbage collection GC3.

Figure 14:
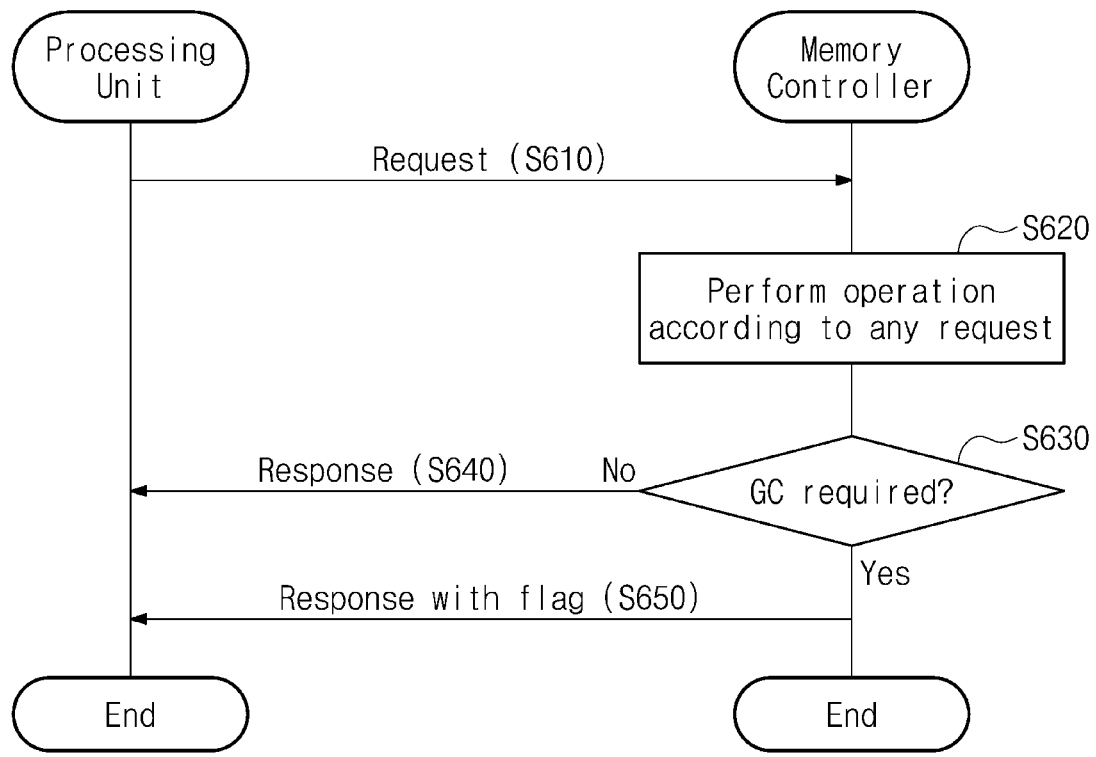
FIG. 14 illustrates a fourth example in which a memory controller provide placement information to a processing unit, according to an embodiment of the present disclosure.

FIG. 14 illustrates a fourth example in which the memory controller 120 provides placement information to the processing unit 12, according to an embodiment of the present disclosure. Referring to FIGS. 1, 2, and 14, in operation S610, the processing unit 12 may send a request to the memory controller 120. For example, the processing unit 12 may send a necessary request to the memory controller 120 depending on a need to instruct the memory controller 120 to perform an operation. For example, the necessary request may include various requests (and/or commands) described by a known communication standard, such as, but not limited to, a read request, a write request, and a status read request. Alternatively or additionally, the necessary request may include various vendor-specific requests (and/or commands) defined by a manufacturer.

In operation S620, the memory controller 120 may perform an operation corresponding to the request of the processing unit 12. For example, the memory controller 120 may perform an operation requested by a request received from the processing unit 12. The memory controller 120 may perform the read operation in response to the read request, may perform the write operation in response to the write request, and/or may collect status information in response to the status read request. The memory controller 120 may perform operations based on the various requests as described by a known communication standard and/or may perform operations based on vendor-specific requests as defined by a manufacturer.

In operation S630, the memory controller 120 may determine whether garbage collection GC may be needed. For example, when the number of free erase units of the fourth storage region 110d is smaller than a threshold value, the memory controller 120 may determine that the garbage collection GC may be needed (Yes on operation S630).

When the garbage collection GC is not needed (No on operation S630), in operation S640, the memory controller 120 may send a response to the processing unit 12. The response may include information about a result of the operation performed in operation S620 (e.g., an operation performed by the request of the processing unit 12). For example, the response may include information about whether the operation performed in operation S620 has succeeded, information needed by the request of the processing unit 12, information about whether the operation performed in operation S620 fails, and/or information about a failure condition. Subsequently, the operation according to the request may end.

When the garbage collection GC may be needed (Yes on operation S630), in operation S650, the memory controller 120 may send a response to the processing unit 12 together with a flag bit. The response may substantially similar to and/or may be the same as the response in operation S640. That is, the content of the response in operation S650 may match the content of the response in operation S640. The flag bit may indicate that garbage collection for erase units of the fourth storage region 110d may be needed.

When the response is received together with the flag bit, the processing unit 12 may perform the status read operation, as described with reference to FIG. 13, and may obtain the zone placement information from the memory controller 120. The processing unit 12 may secure (e.g., make available) free erase units of the fourth storage region 110d by performing the third garbage collection GC3 based on the zone placement information.

As described above, when garbage collection may be needed in the storage device 100, the storage device 100 may request garbage collection from the processing unit 12 (e.g., by using the flag bit). The processing unit 12 may obtain the zone placement information from the storage device 100 and/or may perform garbage collection (e.g., the third garbage collection GC3) based on the zone placement information. Accordingly, the electronic device 10 and the storage device 100 may have improved lifetime and reliability, compared to a related electronic device and storage device, by preventing the double write DW.

Figure 15:
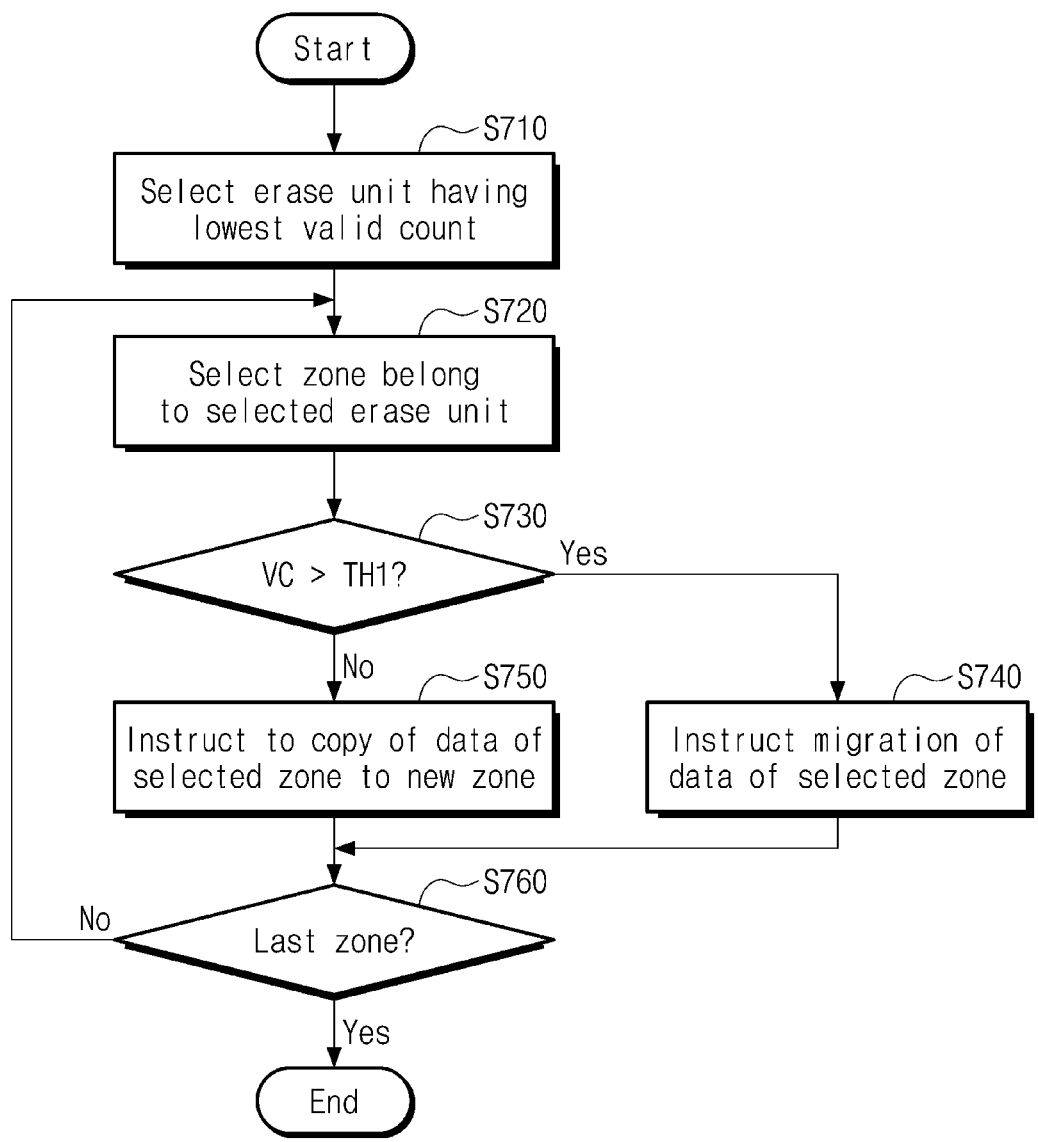
FIG. 15 illustrates a second example of a process where a processing unit performs third garbage collection, according to an embodiment of the present disclosure.

FIG. 15 illustrates a second example of a process where the processing unit 12 performs the third garbage collection GC3, according to an embodiment of the present disclosure. Referring to FIGS. 1, 2, and 15, in operation S710, the processing unit 12 may select an erase unit whose valid page count is the lowest. In operation S720, the processing unit 12 may select a zone corresponding to the selected erase unit. Operation S710 and operation S720 may respectively correspond to operations S210 and S220 of FIG. 9.

In operation S730, the processing unit 12 may determine whether the valid page count VC of the selected victim zone is greater than a first threshold value TH1. When the valid page count VC of the selected victim zone is greater than the first threshold value TH1 (Yes in operation S730), in operation S740, the processing unit 12 may instruct the memory controller 120 to perform migration of data of the selected victim zone.

In an embodiment, as the valid page count VC of the victim zone increases, the garbage collection and migration overhead performed with respect to the data of the victim zone may increase. When the valid page count VC of the selected victim zone is greater than the first threshold value TH1 (Yes in operation S730), the processing unit 12 may decrease the write amplification factor WAF by instructing migration.

When the valid page count VC of the selected victim zone is not greater than the first threshold value TH1 (No in operation S730), in operation S750, the processing unit 12 may instruct the memory controller 120 to copy the data of the selected victim zone to a new zone. Operation S750 may correspond to operation S230 of FIG. 9.

When the copy or migration of the selected zone is completed, in operation S760, the processing unit 12 may determine whether the selected zone is the last zone. Operation S760 may correspond to operation S240 of FIG. 9.

Depending on a result of operation S760, the processing unit 12 may again perform operation S720 or may end the process.

In an embodiment, when data of two or more zones are present in a victim erase unit, at least one of the two or more zones may be selected as a migration target, and the others thereof (e.g., remaining zones) may be selected as a target of the third garbage collection GC3.

Figure 16:
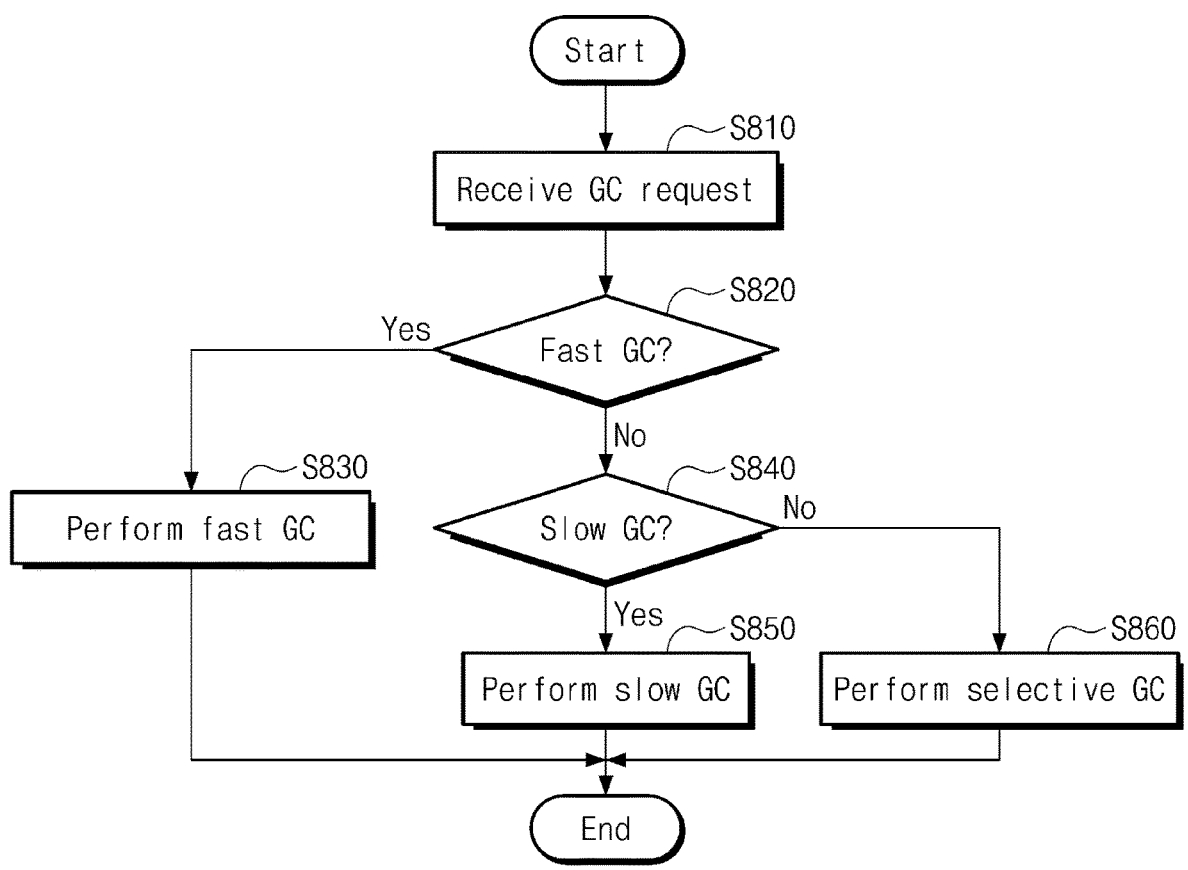
FIG. 16 illustrates an example in which an electronic device performs fast garbage collection and slow garbage collection, according to an embodiment of the present disclosure.

FIG. 16 illustrates an example in which the electronic device 10 performs fast garbage collection and slow garbage collection, according to an embodiment of the present disclosure. Referring to FIGS. 1, 2, and 16, in operation S810, the memory controller 120 may receive a garbage collection (GC) request from the processing unit 12. The garbage collection request may be a request for the third garbage collection GC3. In an embodiment, the garbage collection request may be and/or may include at least one of the zone copy request and the write request associated with the third garbage collection GC3.

In operation S820, the memory controller 120 may determine whether the received garbage collection request is associated with fast garbage collection. For example, the memory controller 120 may determine whether information indicating the fast garbage collection is included in the garbage collection request.

When the received garbage collection request is associated with the fast garbage collection (Yes in operation S820), in operation S830, the memory controller 120 may perform the fast garbage collection. In the fast garbage collection, the memory controller 120 may write (and/or buffer) data of a new zone generated by the third garbage collection GC3 in an erase unit of the fourth storage region 110d.

In an embodiment, the processing unit 12 may be configured to send the fast garbage collection request to the memory controller 120 when the number of free erase units of the fourth storage region 110d is sufficient. For example, when the number of free erase units of the fourth storage region 110d is insufficient and the fast garbage collection of one or more specific zones may be needed, the processing unit 12 may secure (e.g., make available) free erase units of the fourth storage region 110d by performing the third garbage collection GC3 and may request the fast garbage collection from the memory controller 120.

When the received garbage collection request is not associated with the fast garbage collection (No in operation S820), in operation S840, the memory controller 120 may determine whether the received garbage collection request is associated with slow garbage collection. For example, the memory controller 120 may determine whether information indicating the slow garbage collection is included in the garbage collection request.

When the received garbage collection request is associated with the slow garbage collection (Yes in operation S820), in operation S850, the memory controller 120 may perform the slow garbage collection. In the slow garbage collection, the memory controller 120 may directly write data of a new zone generated by the third garbage collection GC3 in an erase unit of the first storage region 110a allocated to the new zone.

When the received garbage collection request is not associated with the slow garbage collection (No in operation S820), in operation S860, the memory controller 120 may perform selective garbage collection. For example, when there are free erase units of the fourth storage region 110d capable of buffering data of a new zone generated by garbage collection, the memory controller 120 may write (e.g., buffer) the data of the new zone in the free erase units of the fourth storage region 110d.

When the number of free erase units of the fourth storage region 110d capable of buffering data of a new zone generated by garbage collection is insufficient, the memory controller 120 may directly write at least a portion of the data of the new zone in an erase unit of the first storage region 110a allocated to the new zone and may write (e.g., buffer) the remaining portion thereof in one or more free erase units of the fourth storage region 110d. Based on the sequentiality of logical addresses and physical addresses, data corresponding to previous logical addresses may be written in an erase unit of the first storage region 110a.

When there are no free erase units of the fourth storage region 110d capable of buffering data of a new zone generated by garbage collection, the memory controller 120 may directly write the data of the new zone in the erase unit of the first storage region 110a allocated to the new zone.

In an embodiment, when writing (e.g., buffering) data in erase units of the fourth storage region 110d depending on a request of the processing unit 12, the memory controller 120 may compress the data and may write the compressed data in erase units of the fourth storage region 110d.

When reading data from erase units of the fourth storage region 110d depending on a request of the processing unit 12, the memory controller 120 may decompress the read data and may provide the decompressed data to the processing unit 12.

When copying data of erase units of the fourth storage region 110d to erase units of the fourth storage region 110d depending on the zone copy request for the third garbage collection GC3, the memory controller 120 may copy the data without decompression.

When copying data of erase units of the fourth storage region 110d to erase units of the first storage region 110a depending on the zone copy request for the third garbage collection GC3, the memory controller 120 may copy the data after decompression.

When migrating data of erase units of the fourth storage region 110d to erase units of the first storage region 110a depending on the migration request, the memory controller 120 may migrate the data after decompression.

Figure 17:
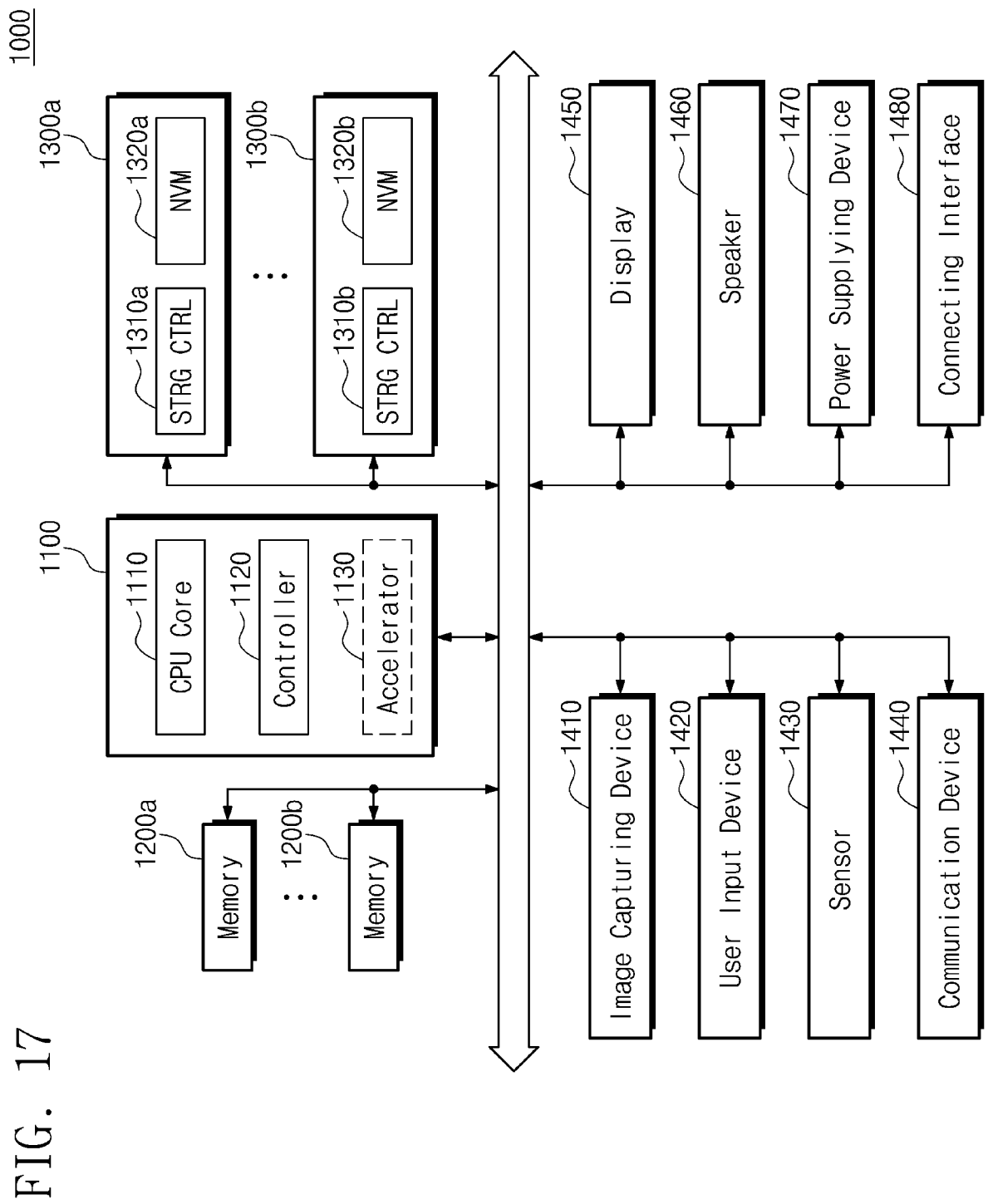
FIG. 17 is a diagram illustrating a system, according to an embodiment of the present disclosure.

FIG. 17 is a diagram of a system 1000 to which a storage device is applied, according to an embodiment, according to an embodiment of the present disclosure. The system 1000 of FIG. 17 may be and/or may include a mobile system such as, but not limited to, a portable communication terminal (e.g., a mobile phone), a smartphone, a tablet, a personal computer (PC), a wearable device, a healthcare device, an Internet of things (IoT) device, and the like. However, the system 1000 of FIG. 17 may not be limited to the mobile system and may be and/or may include another electronic device such as, but not be limited to, a PC, a laptop computer, a server, a media player, an automotive device (e.g., a navigation device), and the like.

Referring to FIG. 17, the system 1000 may include a main processor 1100, memories (e.g., 1200a and 1200b), and storage devices (e.g., 1300a and 1300b). Alternatively or additionally, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control the operations of the system 1000. Alternatively or additionally, the main processor 1100 may control operations of other components included in the system 1000. The main processor 1100 may be implemented as a general-purpose processor, a dedicated processor, an application processor, and/or the like.

The main processor 1100 may include at least one CPU core 1110, and/or further include a controller 1120 configured to control the memories 1200a and 1200b and/or the storage devices 1300a and 1300b. In some embodiments, the main processor 1100 may further include an accelerator 1130, which may be and/or may include a dedicated circuit for a high-speed data operation, such as, but not limited to, an artificial intelligence (AI) data operation. For example, the accelerator 1130 may include a graphics processing unit (GPU), a neural processing unit (NPU) and/or a data processing unit (DPU). Alternatively or additionally, the accelerator 1130 may be implemented as a chip that may be physically separate from the other components of the main processor 1100.

The memories 1200a and 1200b may be used as main memory devices of the system 1000. Each of the memories 1200a and 1200b may be and/or may include a volatile memory, such as, but not limited to, static RAM (SRAM) and/or dynamic RAM (DRAM), and/or a non-volatile memory, such as, but not limited to, a flash memory, a phase-change RAM (PRAM), a resistive RAM (RRAM), and the like. In an embodiment, the memories 1200a and 1200b may be implemented in the same package as the main processor 1100.

The storage devices 1300a and 1300b may serve as non-volatile storage devices configured to store data regardless of whether power has been supplied thereto. In an embodiment, the storage devices 1300a and 1300b may have a larger storage capacity than the memories 1200a and 1200b. The storage devices 1300a and 1300b may respectively include storage controllers (STRG CTRL) 1310a and 1310b and NVMs 1320a and 1320b configured to store data via the control of the storage controllers 1310a and 1310b. Although the NVMs 1320a and 1320b may be and/or may include flash memories having a two-dimensional (2D) structure or a three-dimensional (3D) (e.g., V-NAND structure), the NVMs 1320a and 1320b may be and/or may include other types of NVMs, such as, but not limited to, PRAM, RRAM, and the like.

The storage devices 1300a and 1300b may be physically separated from the main processor 1100, may be included in the system 1000, and/or may be implemented in the same package as the main processor 1100. Alternatively or additionally, the storage devices 1300a and 1300b may be and/or may include various types of solid-state devices (SSDs) and/or memory cards that may be removably combined with other components of the system 1000 through an interface, such as the connecting interface 1480, as described below. The storage devices 1300a and 1300b may be and/or may include devices to which a standard communication protocol, such as a universal flash storage (UFS), multi-media card (MMC), embedded MMC (eMMC), or NVMe may be applied, without being limited thereto.

The image capturing device 1410 may capture still images and/or moving images. The image capturing device 1410 may be and/or may include, but not be limited to, a camera, a camcorder, a webcam, and the like.

The user input device 1420 may receive various types of data input by a user of the system 1000. The user input device 1420 may include, but not be limited to, a touch pad, a keypad, a keyboard, a mouse, a microphone, and the like.

The sensor 1430 may detect various types of physical quantities, which may be obtained from the outside of the system 1000, and/or may convert the detected physical quantities into electric signals. The sensor 1430 may include, but not be limited to, a temperature sensor, a pressure sensor, an illuminance sensor, a position sensor, an acceleration sensor, a biosensor, a gyroscope sensor, and/or the like.

The communication device 1440 may transmit and/or receive signals between other devices outside the system 1000, according to various communication protocols. The communication device 1440 may include, but not be limited to, an antenna, a transceiver, a modem, and/or the like.

The display 1450 and the speaker 1460 may serve as output devices configured to output visual information and auditory information, respectively, to the user of the system 1000.

The power supplying device 1470 may convert power supplied from a battery (not shown) embedded in the system 1000 and/or an external power source. In an embodiment, the power supplying device 1470 may supply the converted power to each of components of the system 1000.

The connecting interface 1480 may provide connections between the system 1000 and external devices, which may be connected to the system 1000 and/or may be capable of transmitting and/or receiving data to and/or from the system 1000. The connecting interface 1480 may be implemented by using various interface schemes, such as, but not limited to, advanced technology attachment (ATA), serial ATA (SATA), external SATA (e-SATA), small computer small interface (SCSI), serial attached SCSI (SAS), PCI, PCIe, NVMe, Institute of Electrical and Electronics Engineers (IEEE) 1394 (FireWire), a USB interface, a secure digital (SD) card interface, an MMC interface, an eMMC interface, a UFS interface, an embedded UFS (eUFS) interface, a compact flash (CF) card interface, and the like.

In an embodiment, the storage devices described with reference to FIGS. 1 to 16 may be implemented with the storage devices 1300a and 1300b. Alternatively or additionally, the processing unit 12 described with reference to FIGS. 1 to 16 may be implemented with the main processor 1100. For example, the storage devices 1300a and 1300b may provide zone placement information to the main processor 1100. The main processor 1100 may perform third garbage collection and/or second garbage collection based on the zone placement information. The description given with reference to the storage device 11 or the storage device 100 and the processing unit 12 in FIGS. 1 to 16 may be equally applied to the storage devices 1300a and 1300b and the main processor 1100 of FIG. 17.

In the above embodiments, components according to embodiments of the present disclosure may be referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Alternatively or additionally, the blocks may include circuits implemented with semiconductor elements in an integrated circuit, or circuits enrolled as an intellectual property (IP).

According to embodiments of the present disclosure, a processing unit may perform garbage collection based on placement information indicating how data are stored in a storage device. Alternatively or additionally, when garbage collection may be needed in the storage device, the processing unit may perform garbage collection based on the placement information depending on a request of the storage device. Accordingly, a storage device that may internally prevent an unnecessary write from being performed and may reduce the write amplification factor WAF, an electronic device including the storage device, and an operating method of the electronic device including the storage device are provided.

While the present disclosure has been described with reference to embodiments thereof, it may be apparent to those of ordinary skill in the art that various changes and modifications may be made thereto without departing from the spirit and scope of the present disclosure as set forth in the following claims.

What is claimed is:

1. A storage device, comprising:
   a nonvolatile memory device comprising a plurality of erase units, each erase unit of the plurality of erase units comprising a plurality of memory cells; and
   a memory controller configured to:
   assign first memory cells of each erase unit of a plurality of first erase units among the plurality of erase units as y-level cells, each y-level cell of the y-level cells storing y bits, y being a positive integer greater than zero;
   assign second memory cells of each erase unit of a plurality of second erase units among the plurality of erase units as x-level cells, each x-level cell of the x-level cells storing x bits, x being a positive integer greater than zero and less than y;
   allocate, based on an open zone request received from an external host device, a zone to at least one first erase unit among the plurality of first erase units, and permit a sequential write with respect to the zone;
   buffer data to be written in the zone by storing the data in at least one second erase unit among the plurality of second erase units; and
   provide the external host device with information about the at least one second erase unit buffering the data to be written in the zone.

2. The storage device of claim 1, wherein the information about the at least one second erase unit comprises:
   a start logical address of the data to be written in the zone;
   a length of the data to be written in the zone; and
   an identifier of the at least one second erase unit.

3. The storage device of claim 2, wherein the information about the at least one second erase unit further comprises:
   offset information about a page at which a portion of the data to be written in the zone that is to be written in each erase unit of the at least one second erase unit; and
   a valid page count of the portion of the data to be written in the zone that is to be written in each erase unit of the at least one second erase unit.

4. The storage device of claim 1, wherein the memory controller is further configured to:
   provide, to the external host device, the information about the at least one second erase unit, based on a zone close request for the zone,
   wherein the zone close request has been received from the external host device.

5. The storage device of claim 1, wherein the memory controller is further configured to:
   based on determination that a capacity of the zone is full due to a write request for the zone, provide the external host device with the information about the at least one second erase unit as a response of the write request,
   wherein the write request has been received from the external host device.

6. The storage device of claim 1, wherein the memory controller is further configured to:

based on a migration request for the zone that has been received from the external host device, perform migration such that data to be written in the zone from among data of the at least one second erase unit is written in the at least one first erase unit allocated to the zone; and provide the external host device with information about the at least one first erase unit.

7. The storage device of claim 1, wherein the memory controller is further configured to:
provide the external host device with the information about the at least one second erase unit, based on a status read request received from the external host device.

8. The storage device of claim 1, wherein the memory controller is further configured to:
add, when garbage collection is required, a flag bit to a response to at least one request received from the external host device.

9. The storage device of claim 1, wherein the memory controller is further configured to:
when garbage collection is required, provide, to the external host device, the information about the at least one second erase unit as a response to at least one request received from the external host device.

10. An electronic device comprising:
a storage device comprising a plurality of erase units, each erase unit of the plurality of erase units comprising a plurality of memory cells, wherein the storage device is configured to:
assign first memory cells of each erase unit of a plurality of first erase units among the plurality of erase units as y-level cells, each y-level cell of the y-level cells storing y bits; and
assign second memory cells of each erase unit of a plurality of second erase units among the plurality of erase units as x-level cells, each x-level cell of the x-level cells storing x bits, y being a positive integer greater than zero, x being a positive integer greater than zero and less than y; and
a processor configured to:
allocate zones to the plurality of first erase units by sending, to the storage device, an open zone request to the storage device; and
perform a sequential write with respect to the zones,
wherein the storage device is further configured to:
buffer data to be written in the zones by storing the data in the plurality of second erase units; and
provide a processing unit with information about the plurality of second erase units,
wherein the processor is further configured to perform garbage collection of the plurality of second erase units based on the information about the plurality of second erase units.

11. The electronic device of claim 10, wherein the processor is further configured to:
select a second erase unit having a smallest valid page count from among the plurality of second erase units, as a victim erase unit of the garbage collection.

12. The electronic device of claim 11, wherein the processor is further configured to:
select a zone corresponding to data written in the victim erase unit as a victim zone of the garbage collection.

13. The electronic device of claim 12, wherein the processor is further configured to:
request the storage device to copy valid data of the victim zone to a new erase unit.

14. The electronic device of claim 13, wherein the storage device is further configured to:
based on the request to copy the valid data of the victim zone to the new erase unit, copy the valid data of the victim zone to at least one of a second erase unit among the plurality of second erase units and a first erase unit among the plurality of first erase units.

15. The electronic device of claim 11, wherein the processor is further configured to:
select a plurality of zones corresponding to data written in the victim erase unit as victim zones of the garbage collection.

16. The electronic device of claim 15, wherein the processor is further configured to:
instruct the storage device to open a new zone and to copy data of the victim zones to the new zone.

17. The electronic device of claim 11, wherein the processor is further configured to:
when a valid page count of a zone corresponding to data written in the victim erase unit is greater than a threshold value, instruct the storage device to perform migration of the zone.

18. The electronic device of claim 17, wherein the storage device is further configured to:
perform the migration of the zone by maintaining logical addresses of valid data of the zone and changing physical addresses of the valid data of the zone.

19. The electronic device of claim 10, wherein the storage device is further configured to:
perform the garbage collection of the plurality of second erase units by changing logical addresses and physical addresses of data written in the plurality of second erase units.

20. An operating method of an electronic device, comprising:
sending, by a processor of the electronic device, zone open requests to a storage device of the electronic device;
allocating, by the storage device and based on the zone open requests, a plurality of first erase units among a plurality of erase units of the storage device to a plurality of zones;
sending, by the processor to the storage device, sequential write requests respectively associated with the plurality of zones;
buffering, by the storage device, write data of the sequential write requests by using a plurality of second erase units among the plurality of erase units;
sending, by the storage device to the processor, information about the plurality of second erase units;
performing, by the processor, garbage collection of the plurality of second erase units based on the information about the plurality of second erase units;
assigning, by the storage device, first memory cells of each erase unit of the plurality of first erase units as y-level cells, each y-level cell of the y-level cells storing y bits, y being a positive integer greater than zero; and
assigning, by the storage device, second memory cells of each erase unit of the plurality of second erase units as x-level cells, each x-level cell of the x-level cells storing x bits, x being a positive integer greater than zero and less than y.

* * * * *